United States Patent [19]
Hamilton et al.

[11] Patent Number: 6,009,464
[45] Date of Patent: *Dec. 28, 1999

[54] METHOD AND APPARATUS FOR ENABLING APPLICATION PROGRAMS TO COMMUNICATE WITH NETWORK CLIENTS AND SERVERS

[75] Inventors: Graham Hamilton; Peter B. Kessler, both of Palo Alto; Jeffrey Donald Nisewanger, San Jose; Sami Shaio, San Francisco; Jacob Y. Levy; Steven Robert Kleiman, both of Los Altos, all of Calif.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/543,674

[22] Filed: Oct. 16, 1995

Related U.S. Application Data

[60] Provisional application No. 60/004,057, Sep. 20, 1995.

[51] Int. Cl.⁶ .................................................. G06F 13/00
[52] U.S. Cl. ............................................ 709/219; 709/230
[58] Field of Search ............................... 395/200.02, 683, 395/680, 712, 200.06, 200.03, 200.09, 200.33, 200.57, 200.6, 684, 200.47, 200.48, 200.49, 701; 709/304, 203, 217, 218, 219, 300, 205, 230

[56] References Cited

U.S. PATENT DOCUMENTS

| | | | |
|---|---|---|---|
| 5,475,817 | 12/1995 | Waldo et al. ....................... | 395/200.02 |
| 5,481,721 | 1/1996 | Serlet et al. .............................. | 395/683 |
| 5,511,197 | 4/1996 | Hill et al. ................................. | 395/683 |
| 5,515,508 | 5/1996 | Pettus et al. .......................... | 395/200.6 |
| 5,530,852 | 6/1996 | Meske, Jr. et al. ................. | 395/200.03 |
| 5,546,584 | 8/1996 | Lundin et al. ...................... | 395/200.02 |
| 5,577,251 | 11/1996 | Hamilton et al. .................. | 395/200.09 |
| 5,630,066 | 5/1997 | Gosling ............................. | 395/200.47 |
| 5,737,607 | 4/1998 | Hamilton et al. ....................... | 395/701 |
| 5,758,186 | 5/1998 | Hamilton et al. .................. | 395/200.33 |

OTHER PUBLICATIONS author unknown, The Common Object Request Broker: Architecture and Specification, Chapters 1, 2, published by the Object Management Group (OMG), Framington, MA, pp. 1–1 through 2–18, Jul. 1995.

James Gosling, JAVA Intermediate Bytecodes, Jan. 1995, pp. 111–118.

Betz, Mark, Interoperable objects: laying the foundation for distributed object computing, Dr. Dobb's Journal, Oct. 1994, pp. 18–31.

*Primary Examiner*—Zarni Maung
*Assistant Examiner*—Patrice L. Winder
*Attorney, Agent, or Firm*—Townsend and Townsend and Crew LLP

[57] ABSTRACT

A method for enabling an application program to communicate with a network server, includes the steps of downloading a document from a document server to the application program, downloading code from a code server associated with the document server to the application program, the code including a network protocol handler for the network server, and using the network protocol handler to communicate with the network server.

70 Claims, 11 Drawing Sheets

Microfiche Appendix Included
(1 Microfiche, 46 Pages)

//sources.washlaw.edu/6009464.html

METHOD AND APPARATUS FOR ENABLING APPLICATION PROGRAMS TO COMMUNICATE WITH NETWORK CLIENTS AND SERVERS

CROSS-REFERENCE TO RELATED APPLICATION

The present invention claims priority to Provisional Patent Application Serial Number 06/004,057 filed Sep. 20, 1995, and hereby incorporates it by reference.

TRADEMARK NOTICE

Sun, Spring, Solaris, Sunsoft, SunOS, Java and HotJava are trademarks or registered trademarks of Sun Microsystems, Inc. in the United States and other countries. All SPARC trademarks are used under license and are trademarks or registered trademarks of SPARC International, Inc. in the United States of America and other countries. Products bearing SPARC trademarks are based upon an architecture developed by Sun Microsystems, Inc.

BACKGROUND OF THE INVENTION

The present invention relates generally to distributed object-oriented programming, and more specifically to interoperability of distributed objects between network clients and network servers.

In the present disclosure the term "network server" refers to an apparatus on a network that includes software objects, and the term "network client" refers to an apparatus on a network that refers to software objects. The term "network server machine" refers to a host computer that includes a network server, and the term "network client machine" refers to a host computer that includes a network client. The term "document server" refers to an apparatus that provides downloadable documents, and the term "code server" refers to an apparatus that provides downloadable code.

The CORBA

The interoperability of software objects between object-oriented clients and servers has become a significant issue in distributed computing systems. Typically, since different (object-oriented) client/servers have different object interfaces, objects produced by one client/server cannot be used by another client/server. One present effort for standardizing an interface for objects within (object-oriented) client/servers is known as Common Object Request Broker Architecture (CORBA).

The CORBA specification generally provides interfaces by which a client/server can access software objects from another client/server and also provide access to its own software objects to other client/servers. To enable the accessing of such "distributed objects", CORBA specifies an "Interface Definition Language" (IDL) to be used by the client/server, more particularly to be used by object request brokers (ORBs) within each client/server. Exemplary client/servers incorporating IDL include SunOS™ and NEO™ from Sun Microsystems, Inc. and DCE and ORBIX from Digital Equipment Corporation.

Further information regarding CORBA can be found in the following references: "The Common Object Request Broker: Architecture and Specification", Release 2.0, Published by Object Management Group (OMG), Framingham, Mass. July 1995. "The ESSENTIAL CORBA: System Integration Using Distributed Objects" Thomas J. Mowbray, PhD and Ron Zahavi. Published by John Wiley and Object Management Group. 1995.

Although IDL has provided a standardized way of defining object interfaces, CORBA did not specify an "on-the-wire-protocol" for the access of objects across a network. As a result, different vendors have implemented ORBs using different network protocols and different data formats for handling such network objects.

The Java™ Language

With the increasing popularity of the Internet and the World-Wide Web, interoperability of software between completely different computers and operating systems has become an issue. One problem with obtaining software from the Internet is that when a user receives a document from a document server, the user should also obtain an operating system specific driver for the document. With conventional network hypertext mark-up language (HTML) browsers, for example, "helper applications" should be provided, such as movie viewers, sound players, etc. in order to "use" the document. A solution that was developed to overcome this problem is the Java language, developed by Sun Microsystems, Inc.

The Java language is an object-oriented language that can be integrated into conventional HTML browsers and allows a document server to provide the browser with documents as well as executable code. The executable code is automatically loaded from the document server if the HTML browser determines that it does not have the appropriate driver already resident on the user machine. The executable code takes the form of application programs, "applets", comprising "bytecodes" that are machine independent. These applets are then interpreted by operating system specific applet interpreters (virtual machines). A current Internet/Web browser implementation using the Java language is HotJava™, also developed by Sun Microsystems, Inc.

Further information regarding the Java Language and the HotJava browser can be found in the following references: "The Java/Hotjava Programmer's Guide" currently posted at the following Internet site: http://java.sun.com/proGuide/index.html, and "The Java Language Specification" Release 1.0 Alpha3, May 11, 1995 attached as Microfiche Appendix.

SUMMARY OF THE INVENTION

The present invention provides methods and apparatus for allowing application programs to invoke objects within network servers that have different network (on-the-wire) protocols. In particular, the present invention allows document servers to down-load ORBs and network protocols to application programs, thus enabling application programs to invoke objects within network servers.

According to a preferred embodiment, a method for enabling an application program to communicate with a network server, includes the steps of downloading a document from a document server to the application program, downloading code from a code server associated with the document server to the application program, the code including a network protocol handler for the network server, and using the network protocol handler to communicate with the network server.

According to another preferred embodiment, a distributed computing system including a network server also includes a document server for storing a plurality of documents, a code server for storing a plurality of code associated with the plurality of documents, the plurality of code including a network protocol handler, and an application program for loading a document from the plurality of documents, for loading code from the plurality of code associated with the document, and for using the network protocol handler within the code to communicate with the network server.

The present invention also provides methods and apparatus for enabling application programs to receive communications from network clients that have different network (on-the-wire) protocols. In particular, the present invention allows document servers to down-load ORBs and network protocols to application programs, thus enabling network clients to invoke objects in application programs.

According to another preferred embodiment, a method for enabling an application program to receive communications from a network client includes the steps of downloading a document from a document server to the application program, downloading code from a code server associated with the document server to the application program, the code including a network protocol handler for the network client, and using the network protocol handler to receive communications from the network client.

According to yet another preferred embodiment a distributed computing system including a network client also includes a document server for storing a plurality of documents, a code server for storing a plurality of code associated with the plurality of documents, the plurality of code including a network protocol handler, and an application program for loading a document from the plurality of documents, for loading code from the plurality of code associated with the document, and for using the network protocol handler within the code to receive communications from the network client.

DESCRIPTION OF THE PREFERRED EMBODIMENT

Figure 1:
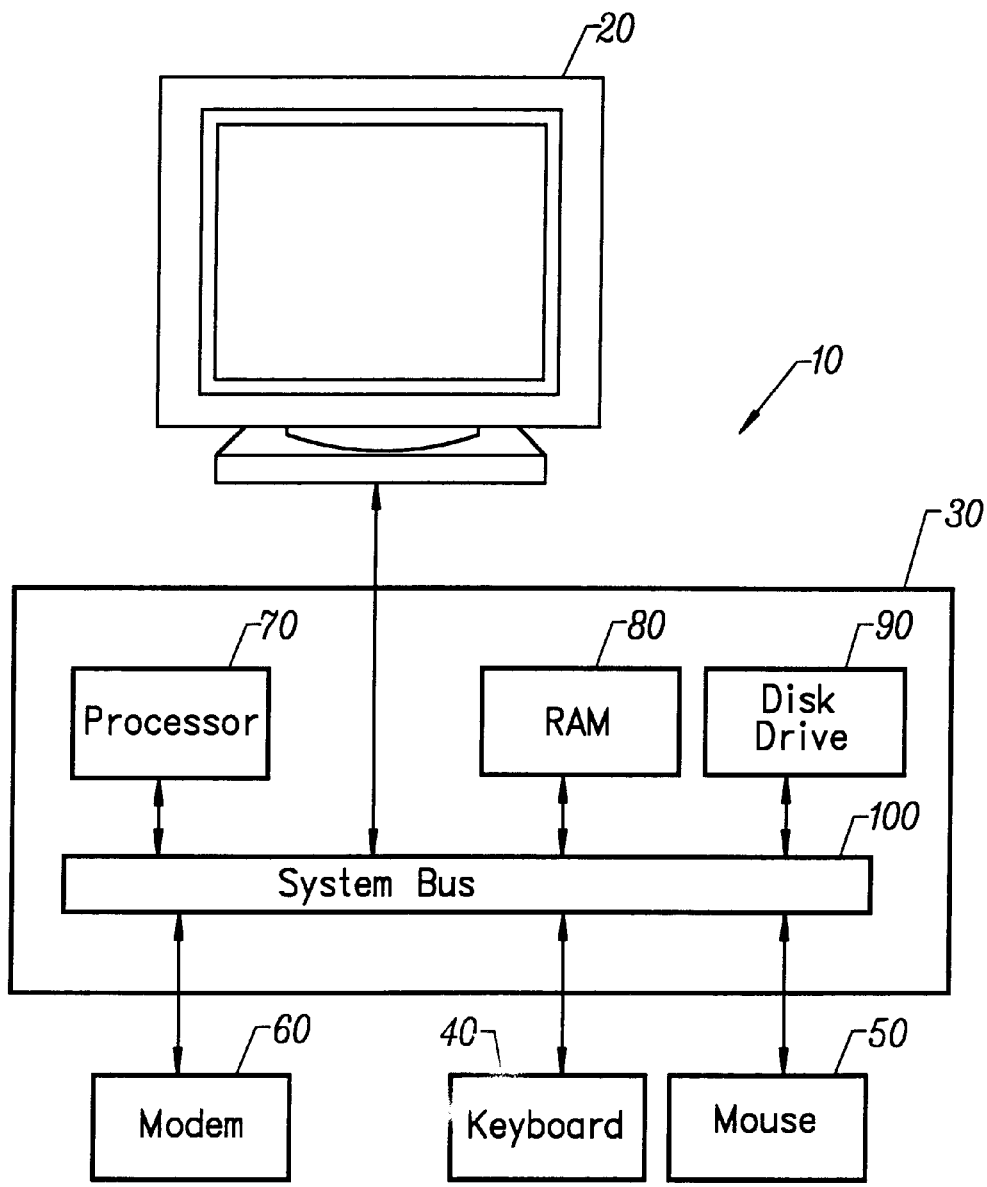
FIG. 1 is a block diagram of a system according to a preferred embodiment of the present invention.

FIG. 1 is a block diagram of a system 10 according to a preferred embodiment of the present invention. System 10 includes a display monitor 20, a computer 30, a keyboard 40, a mouse 50, and a modem 60. Computer 30 includes familiar computer components such as a processor 70, memory storage devices such as a random access memory (RAM) 80 and a disk drive 90, and a system bus 100, interconnecting the above components. Mouse 50 is but one example of a graphical input device, a trackball is an example of another. Modem 60 is but one example of a device enabling system 10 to be coupled to a network, a network interface card is another. RAM 80, disk drive 90 are examples of tangible media for storage of computer programs, other types of tangible media include floppy disks, removable hard disks, optical storage media such as CD-ROMS and bar codes, and semiconductor memories such as flash memory and read-only-memories (ROMS).

In a preferred embodiment, system 10 includes a SPARC-Station™ 10 computer from Sun Microsystems, Inc., running the Solaris™ operating system and HotJava software from Sun Microsystems, Inc.

FIG. 1 is representative of but one type of system for embodying the present invention. It will be readily apparent to one of ordinary skill in the art that many system types and configurations are suitable for use in conjunction with the present invention, such as WindowsNT® or Windows95® from Microsoft Corporation on a IBM-PC compatible computer.

Figure 2:
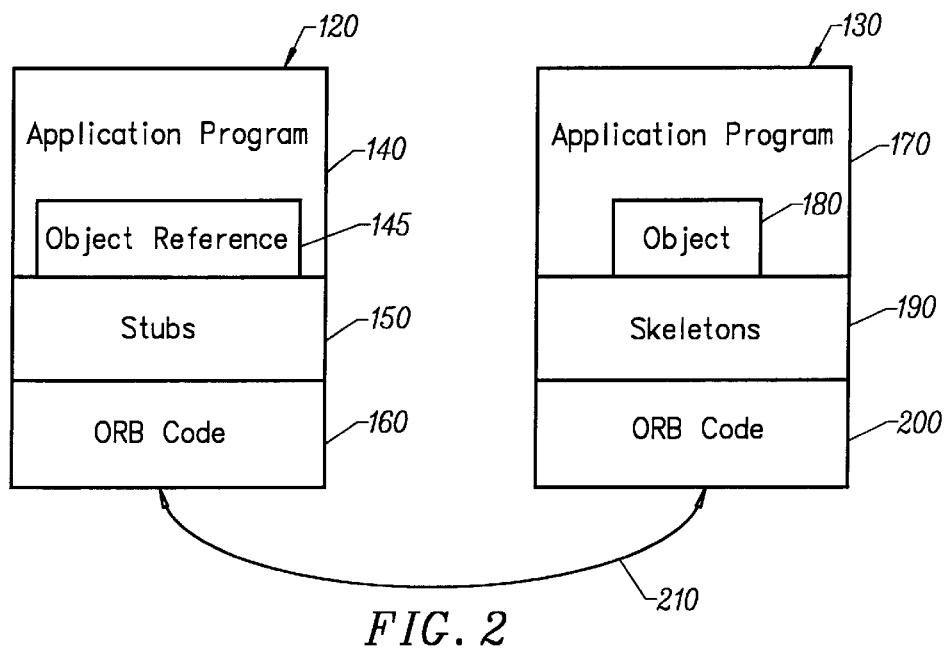
FIG. 2 is a block diagram of the process of an application program invoking a method on an object in a network server.

FIG. 2 is a block diagram of the process of an application program invoking a method on an object in a network server. FIG. 2 includes a network client 120 and a network server 130. Network client 120 includes an application program 140, object reference 145, network client stubs (stubs) 150, and ORB specific code 160. Network server 130 includes a application program 170 including an object 180, network server stubs (skeletons) 190, and ORB specific code 200. Path 210 provides communication between network client 120 and network server 130.

In a typical distributed computing system, application program 140 is an object-oriented application running under a commercial operating system such as Solaris, and application program 170 is also an object-oriented application running under a commercial operating system such as Solaris.

Network client stubs (stubs) 150 are known to application program 140 and serve to receive requests from application program 140. These requests typically include calling methods provided by object 180. Based upon the requests from application program 140, stubs 150 serve to "marshal" data appropriate to the request. Marshaling will be further described in conjunction with FIG. 3.

In order to ensure network client 120 and network server 130 can communicate with each other, each side's ORB specific codes 160 and 200 are preferred to be IDL compliant. Further, when network client 120 and network server 130 communicate across a network, such as path 210, each side should ensure that ORB specific codes 160 and 200 both can transmit data using a network protocol supported by the other side.

In operation, when application program 140 attempts to invoke a method of object 180, application program 140 invokes stubs 150. Stubs 150 marshal the appropriate data for the method invocation and the ORB specific code 160 transmits the data to ORB specific code 200. As will be described in conjunction with FIG. 3, ORB specific code 160 includes a network protocol handler specifically for communicating with ORB specific code 200 across path 210.

Once ORB specific code 200 receives the data, network server stubs (skeletons) 190 "un-marshal" the data, and provide the method request to application program 170. In response, application program 170 invokes the requested method on object 180. Any resulting data from object 180 are transferred back to network client 120 in a process similar to that described above.

I. Application Program as a Network Client

Figure 3:
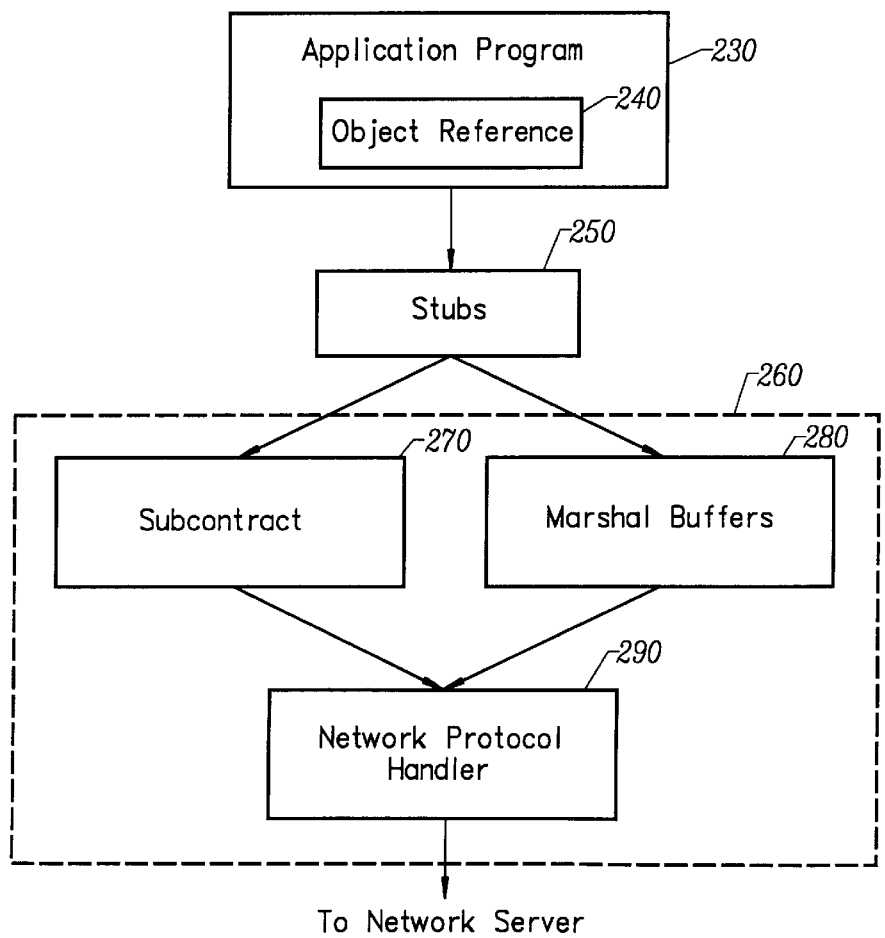
FIG. 3 is a more detailed block diagram of a network client illustrated FIG. 2.

FIG. 3 is a more detailed block diagram of a network client illustrated FIG. 2. FIG. 3 includes application program 230 including an object reference 240, stubs 250, and ORB specific code 260. ORB specific code 260 includes subcontracts 270, marshal buffers 280, and network protocol handlers 290.

Briefly, stubs 250 are used to marshal arguments from application program 230 into marshal buffers 280, call subcontracts 270 to execute remote calls, and to unmarshal any results from a network server. Subcontracts 270 call network protocol handlers 290 which in turn format the data in the network protocol understood by the network server.

Further information regarding typical remote procedure calls in an object-oriented system can be found in the following references: A. D. Birrell and B. J. Nelson, "Implementing Remote Procedure Calls," ACM Trans. on Computer Systems, 2(1), February 1984; and B. J. Nelson, "Remote Procedure Call," Tech report CSL-81-9, Xerox Palo Alto Research Center, Palo Alto, Calif., 1981.

As illustrated in FIGS. 2 and 3, in order to communicate from an application program to a server application, the application program should know, a priori, quite a bit about the server application and network server. For example, the application program should know about they types of objects available on the network server, the application program should know whether the network server is IDL compliant, and the application program should be made aware of the appropriate network protocol of the network server.

Figure 4:
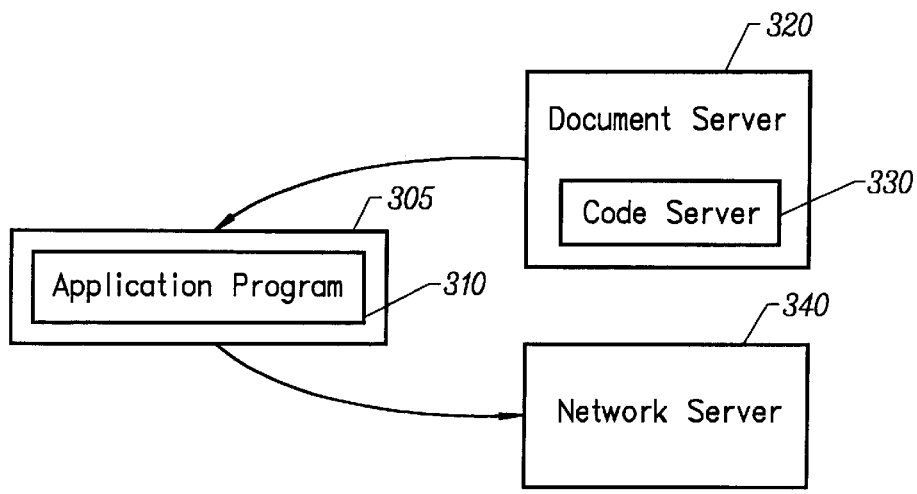
FIG. 4 is a graphic representation of a preferred embodiment of the present invention.

FIG. 4 is a graphic representation of a preferred embodiment of the present invention. FIG. 4 includes a client machine 305 including an application program 310, a document server 320, a code server 330, and a network server 340.

In the preferred embodiment, an application program 310, may or may not be an object-oriented application program. For example, application program 310 may be an Internet document browser such as Hotjava or Netscape Navigator® from Netscape Communications, both which support the Java language. Initially, application program 310 typically is unaware of the network protocol necessary to communicate with network server 340.

Application program 310 is typically couplable and uncouplable with multiple document servers, as illustrated by document server 320. In a preferred embodiment, document server 320 includes code server 330, however alternatively, document server 320 and code server 330 may reside at different address spaces, e.g. on different physical machines. Document server 320 typically downloads documents to application program 310, and code server 330 typically downloads code to application program 310, in response to requests from document server 320. In the preferred embodiment of the present invention, code server 330 downloads Java Language bytecodes which form application programs (applets). When application program 310 executes the applets downloaded from code server 330, application program 310 is given the information necessary to communicate with network server 340.

Figure 5:
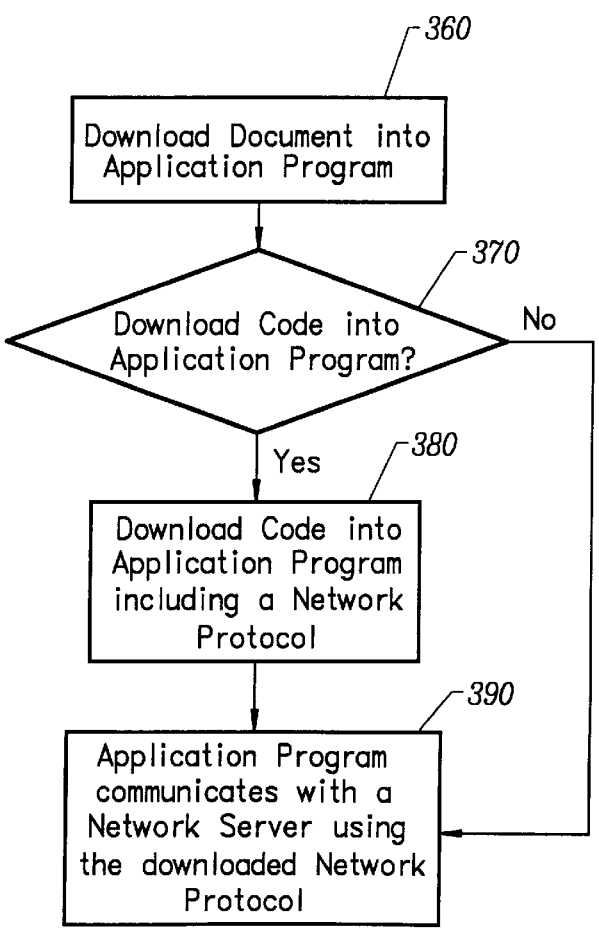
FIG. 5 is a flow diagram of a preferred embodiment of the present invention.

FIG. 5 is a flow diagram of a preferred embodiment of the present invention.

In the preferred embodiment, initially a document server downloads a document to an application program, step 360. For example, the document can be a page of text and graphics. Typically the document will include a plurality of actions the application program may take next, such as downloading another document, as is well known. In the present embodiment, one action the application program may take is to invoke a method on an object within a network server.

Next, typically in response to a user selection on the displayed document, the document server may determine that code, in the form of applets, should be downloaded to the application program, step 370. Alternatively, this step may be skipped entirely, and the process flow continue from step 360 to step 380.

In step 380, code is downloaded from the code server to the application program. As mentioned above, step 370 may be skipped if the document server assumes that typical application programs do not already have the code preloaded on the client machine.

In step 390, the application program executes the downloaded code, and in response, the application program communicates with a particular network server using the appropriate network protocol for that network server. Typically, this communication includes invoking a method of an object resident on the network server.

Note that the application program may not have any network protocol, or have a default network protocol that is different from the network protocol of the network server. In either case, the application program should receive the appropriate network protocol for the network server from the document server.

Figure 6:
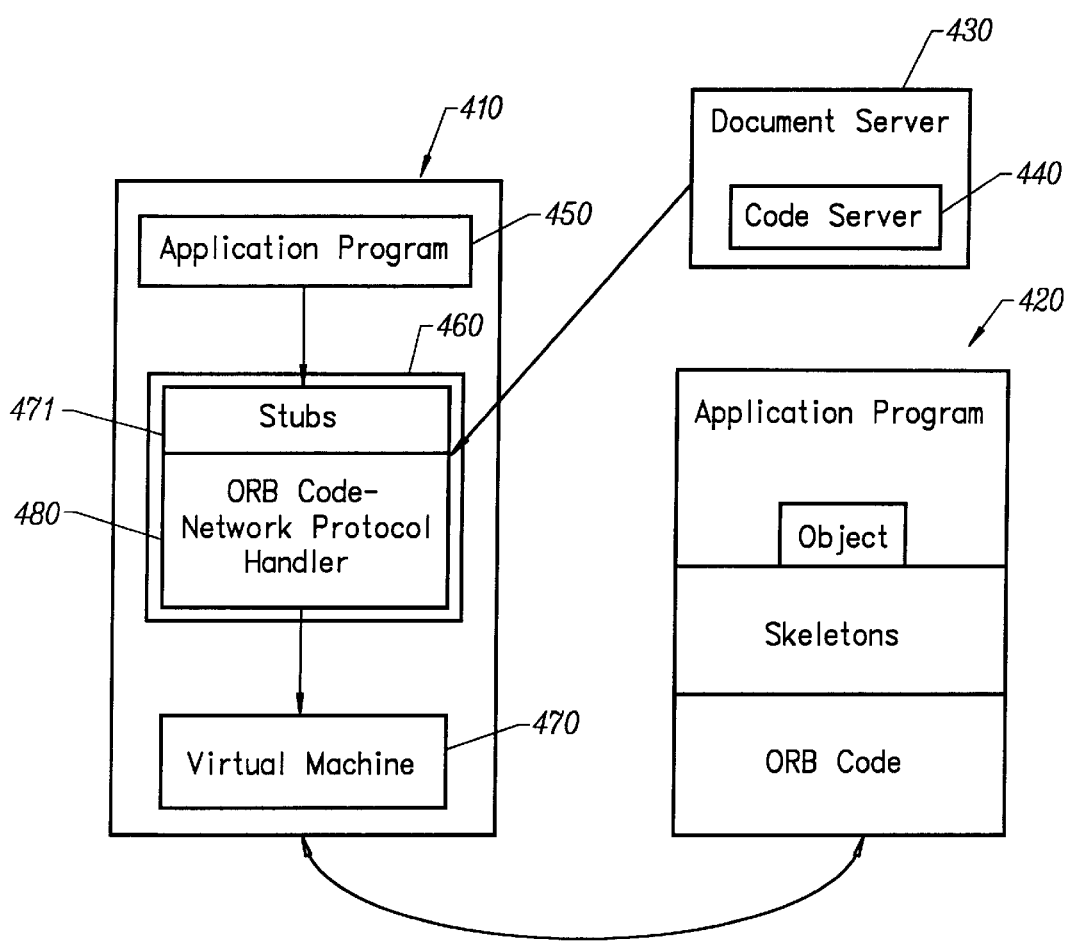
FIG. 6 is a more detailed graphic representation of a preferred embodiment of the present invention.

FIG. 6 is a more detailed graphic representation of a preferred embodiment of the present invention. FIG. 6 includes a network client 410, a network server 420, a document server 430, and a code server 440. Network client 410 includes an application program 450, downloaded code 460, and a virtual machine 470. Downloaded code 460 includes stubs and other ORB specific code 480, in particular, a network protocol handler.

As illustrated, initially if application program 450 desires to communicate with an application program on network server 420, application program 450 is unaware of how to do so. However, after downloaded code 460 is executed by application program 450, application program 450 then has the tools necessary to communicate with network server 420. In one particular embodiment, tools include stubs 471 and ORB specific code 480.

In the preferred embodiment of the present invention, virtual machine 470 is provided to emphasize that downloaded code 460 comprise Java Language bytecodes. In the preferred embodiment, downloaded code 460 is initially written as IDL compliant ORB code, this code is then compiled to become Java Language bytecodes. Because Java Language bytecodes are machine independent, virtual machines, such as virtual machine 470, are created for different network client 410 host machines to interpret the bytecodes.

Figure 7:
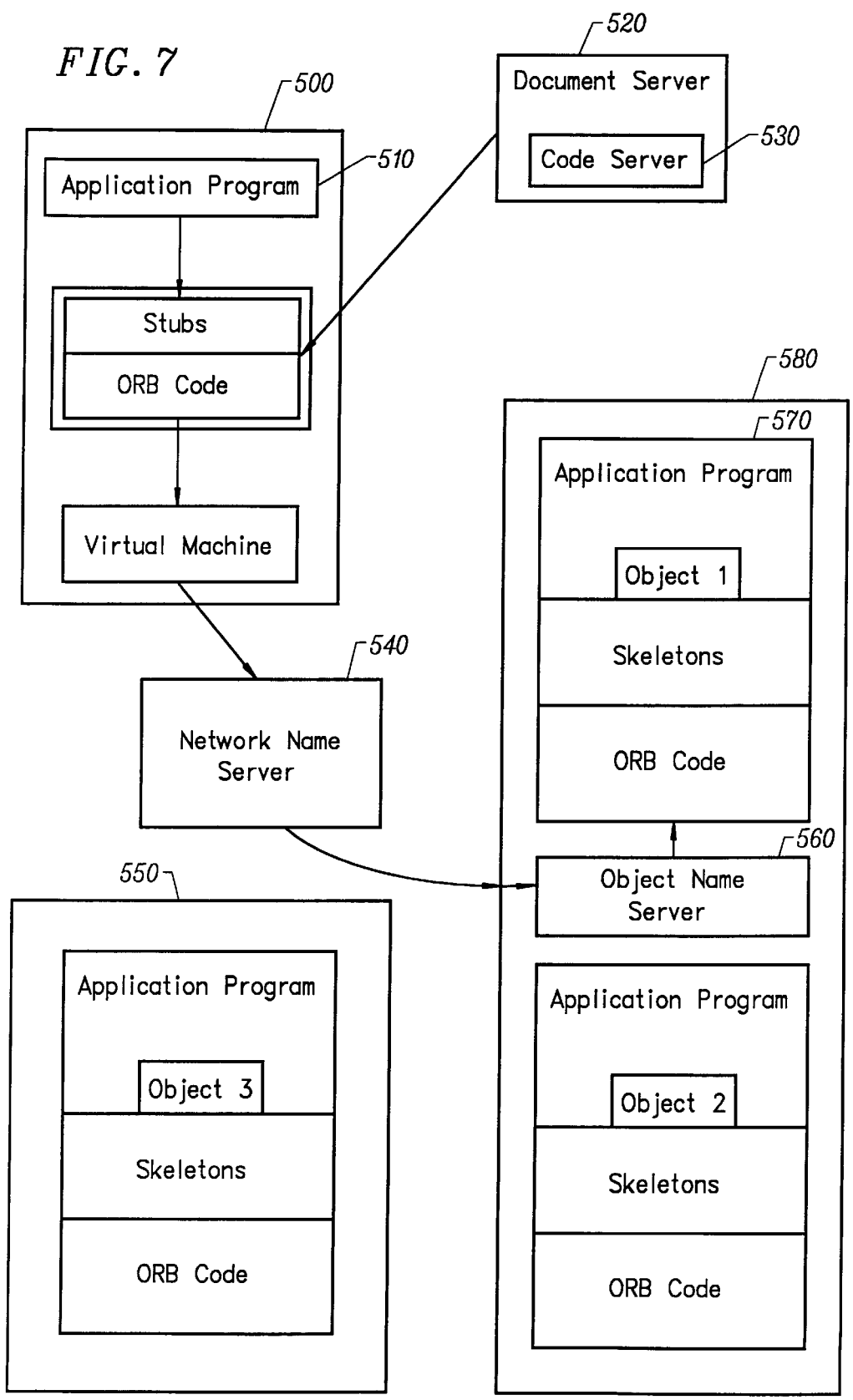
FIG. 7 is a graphic representation of the concepts of a network name server and an object name server.

FIG. 7 is a graphic representation of the concepts of a network name server and an object name server. FIG. 7 includes a client machine 500 including an application program 510, a document server 520, a code server 530, a network name server 540, network server machines 550 and 580, an object name server 560 and a network server 570.

Network name servers such as network name server 540, are servers that return a machine address for a network server in response to an inputted network server name. Such network name servers are well known in the art. Object name servers such as object name server 530, are servers that are resident in network server machines. Object name servers return references to network servers in response to an inputted object name. Such object name servers are also well known in the art.

In operation, as described in conjunction with FIG. 4, code server 520 downloads applets that enable application program 510 to communicate with network server 570. Application program 510, however may only be given the logical name for the network server. Thus, in order to find the network server machine within which network server 570 resides, application program 510 refers to network name server 540 to find the network server machine address.

As illustrated in FIG. 7, once application program 510 has located network server machine 550, application program 510 typically refers to object name server 560 to find a reference to network server 570. It is noted that document server 520, code server 530, and network server 570 may reside within the same physical machine, may share the same address space, or document server 520 may know beforehand the network server machine address of the network server, thus in such cases, a network name server is not needed.

Figure 8:
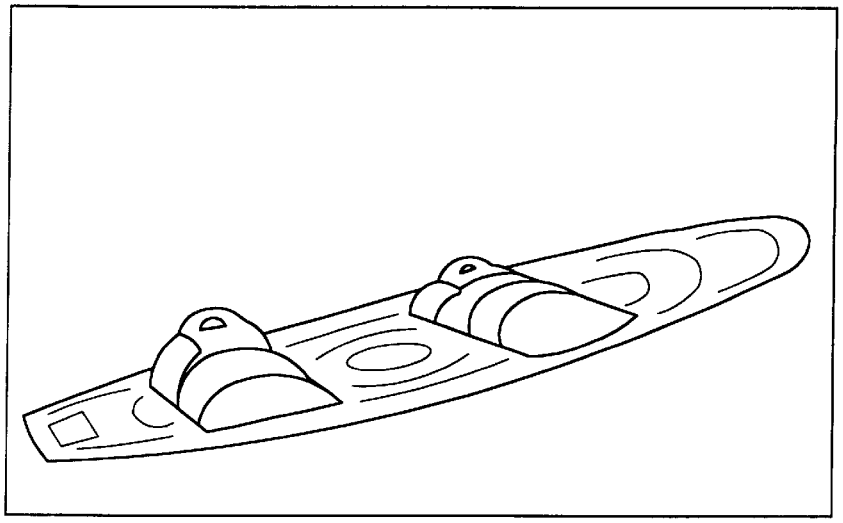
FIG. 8 is an example of a potential end user application incorporating the preferred embodiment of the present invention.

FIG. 8 is an example of a potential end user application incorporating the preferred embodiment of the present invention. FIG. 8 includes a display of a document on a web browser and a plurality of buttons, such as button 590.

In FIG. 8, the application program illustrated is an Internet browser, such as HotJava. The application program has connected to a document server having the address "file://localhost/export/JOE/goodbuys.html" and the document is displayed to the user as shown in FIG. 8. The document illustrates a page in an on-line catalog where a user can place orders for goods. Unbeknownst to the application program, the on-line ordering system is an object-oriented network server having a particular network protocol.

When the user wishes to place an order for the item, the user selects button 590. The application program transmits the user's selection of button 590 to the document server, and in response, the document server has an associated code server download Java Language applets to the application program. After the applets have been downloaded, the application program executes the applets. These applets contain object stubs, ORB specific code including the particular network protocol of the on-line ordering system, a network name of the on-line ordering system, etc. The application program then connects to the on-line ordering system, and upon connection therewith, invokes an object within the on-line ordering system. Typically the on-line ordering system returns an acknowledgement signal which is passed back to the application program.

II. Application Program as a Network Server

Figure 9:
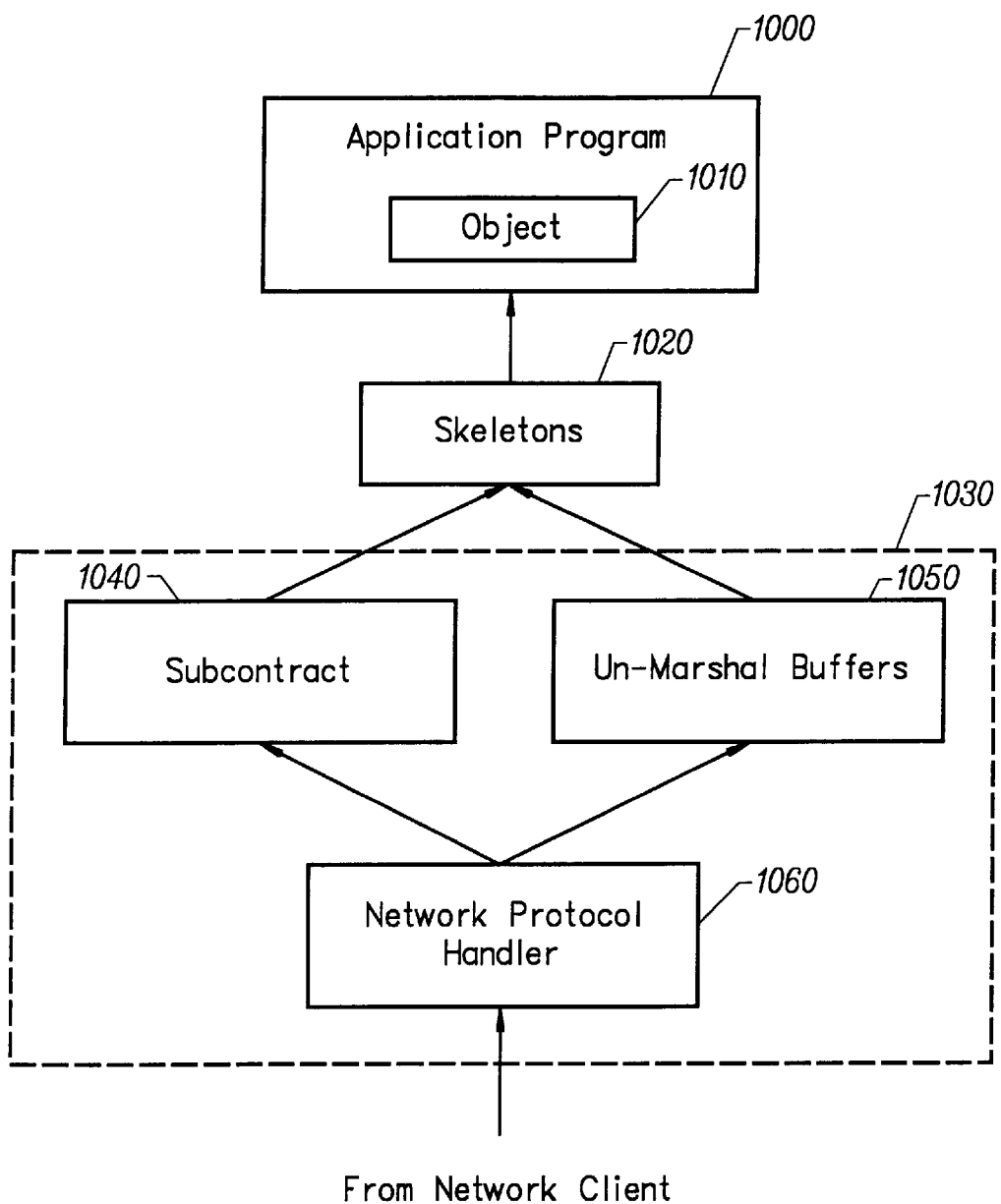
FIG. 9 is a more detailed block diagram of a network server illustrated FIG. 2.

FIG. 9 is a more detailed block diagram of a network server illustrated FIG. 2. FIG. 9 includes application program 1000 including an object 1010, skeletons 1020, and ORB specific code 1030. ORB specific code 1030 includes subcontracts 1040, marshal buffers 1050, and network protocol handlers 1060.

Network protocol handlers 1060 receive data from a network client and uses subcontracts 1040 to place data into marshal buffers 1050. Skeletons 1020 are then used to unmarshal the arguments to a form that application program 1000 understands. Application program 1000 then invokes a method on object 1010.

Further information regarding typical remote procedure calls in an object-oriented system can also be found in the references: A. D. Birrell and B. J. Nelson, "Implementing Remote Procedure Calls," ACM Trans. on Computer Systems, 2(1), February 1984; and B. J. Nelson, "Remote Procedure Call," Tech report CSL-81-9, Xerox Palo Alto Research Center, Palo Alto, Calif., 1981.

As illustrated in FIGS. 2 and 9, in order for an application program to provide an object to a network client, the application program should know, a priori, how to support objects. For example, the application program should know what objects are going to be accessed from the client server, the application program should support the IDL specification, and the application program should have a network protocol which is known by network client.

Figure 10:
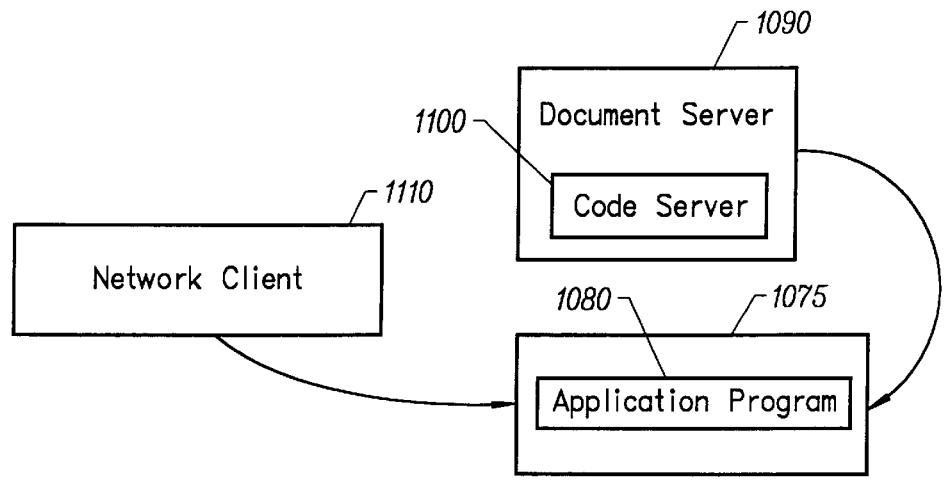
FIG. 10 is a graphic representation of a preferred embodiment of the present invention.

FIG. 10 is a graphic representation of a preferred embodiment of the present invention. FIG. 10 includes a network server machine 1075 including an application program 1080, a document server 1090, a code server 1100, and a network client 1110.

In the preferred embodiment, a application program 1080, may or may not be an object-oriented application program. For example, application program 1080 may be an Internet document browser such as HotJava or Navigator, both which support the Java language. Initially, application program 1080 typically is unaware of how to support network objects and the network protocol necessary to receive communications from network client 1110.

Application program 1080 is typically couplable and uncouplable with multiple document servers, as illustrated by document server 1090. In a preferred embodiment, document server 1090 includes code server 1100, however alternatively, document server 1090 and code server 1100 may reside at different address spaces, e.g. on different physical machines. Document server 1090 typically downloads documents to application program 1080, and code server 1100 typically downloads code to application program 1080, in response to requests from document server 1090. In the preferred embodiment of the present invention, code server 1100 downloads Java Language bytecodes which form application programs (applets), as was described in Section I. When application program 1080 executes the applets downloaded from code server 1100, application program 1080 is given the information necessary to support network objects and methods requested by network client 1110.

Figure 11:
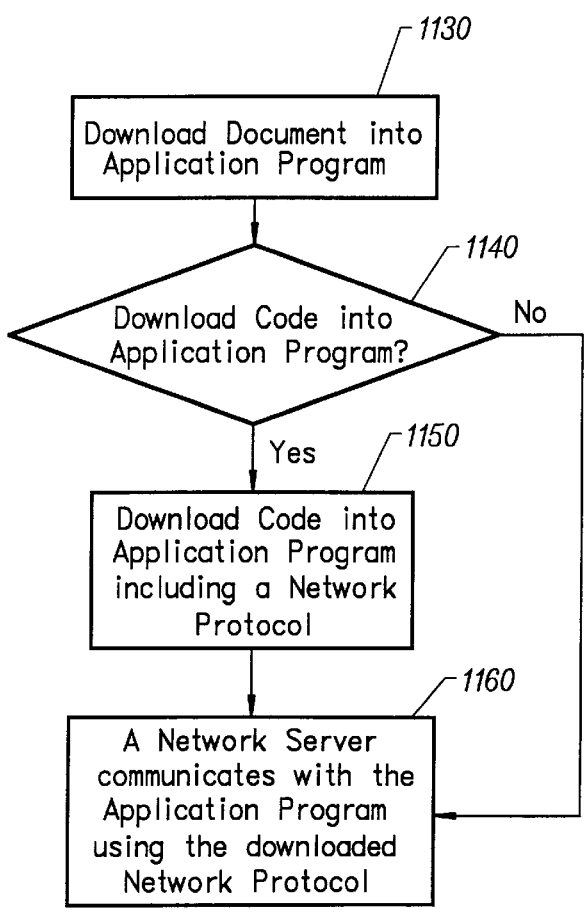
FIG. 11 is a flow diagram of a preferred embodiment of the present invention.

FIG. 11 is a flow diagram of a preferred embodiment of the present invention.

In the preferred embodiment, initially a document server downloads a document to an application program, step 1130. For example, the document can be a page of text and graphics. Typically the document will include a plurality of actions the application program may take next, such as downloading another document as is well known. In the present embodiment, one action the application program may take is to create and support a network object.

Next, typically in response to a user selection on the displayed document, the document server may determine that code, in the form of applets, should be downloaded to the application program, step 1140. Alternatively, this step may be skipped entirely, and the process flow continue from step 1130 to step 1150.

In step 1150, code is downloaded from the code server to the application program. As mentioned above, step 1140 may be skipped if the document server assumes that typical application programs do not already have the code preloaded on the server machine.

In step 1160, the application program executes the downloaded code, and in response, the application program is given the ability to support a network object. Network clients can thus communicate with the application program and invoke methods of the object resident on the application program.

Figure 12:
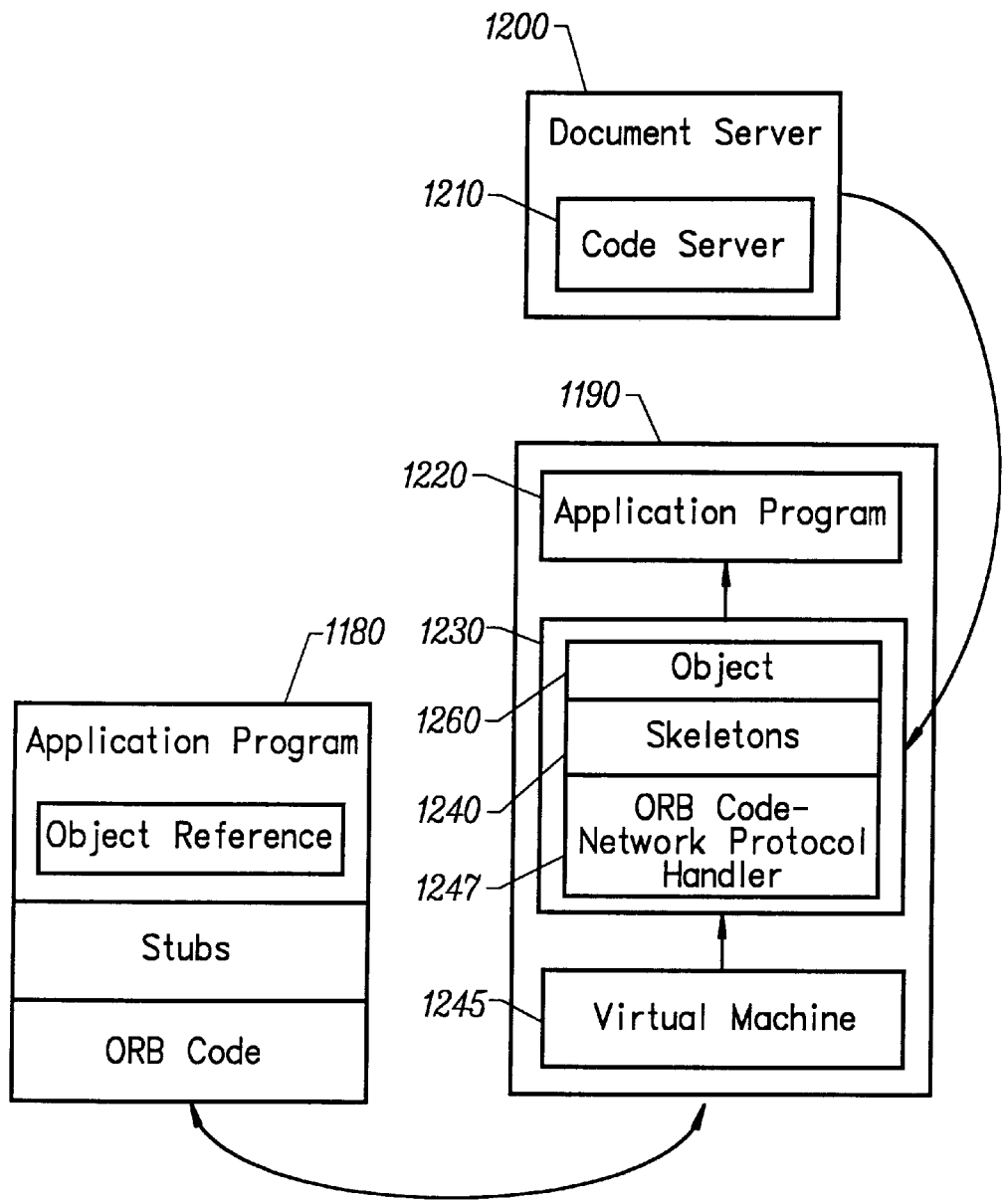
FIG. 12 is a more detailed graphic representation of a preferred embodiment of the present invention.

FIG. 12 is a more detailed graphic representation of a preferred embodiment of the present invention. FIG. 12 includes a network client 1180, a network server 1190, a document server 1200, and a code server 1210. Network server 1190 includes an application program 1220, downloaded code 1230, and a virtual machine 1245. Downloaded code 1230 includes skeletons 1240, other ORB specific code 1247, and an object 1260.

As illustrated, initially application program 1220 cannot receive communications from an application program on network client 1180, since application program 1220 does not have the tools to support an object call. However, after downloaded code 1230 is executed by application program 1220 server application then has the tools necessary to support an object call from network client 1180. In a particular embodiment, tools include skeletons 1240, ORB specific code 1247 and object 1260.

In the preferred embodiment of the present invention, virtual machine 1240 is provided on the network server to emphasize that downloaded code 1230 comprise Java Language bytecodes. In the preferred embodiment, downloaded code 1230 is initially written as IDL compliant ORB code, this code is then compiled to become Java Language bytecodes. Because Java Language bytecodes are machine independent, virtual machines, such as virtual machine 1240, are created for different network server 1190 host machines to interpret the bytecodes.

Figure 13:
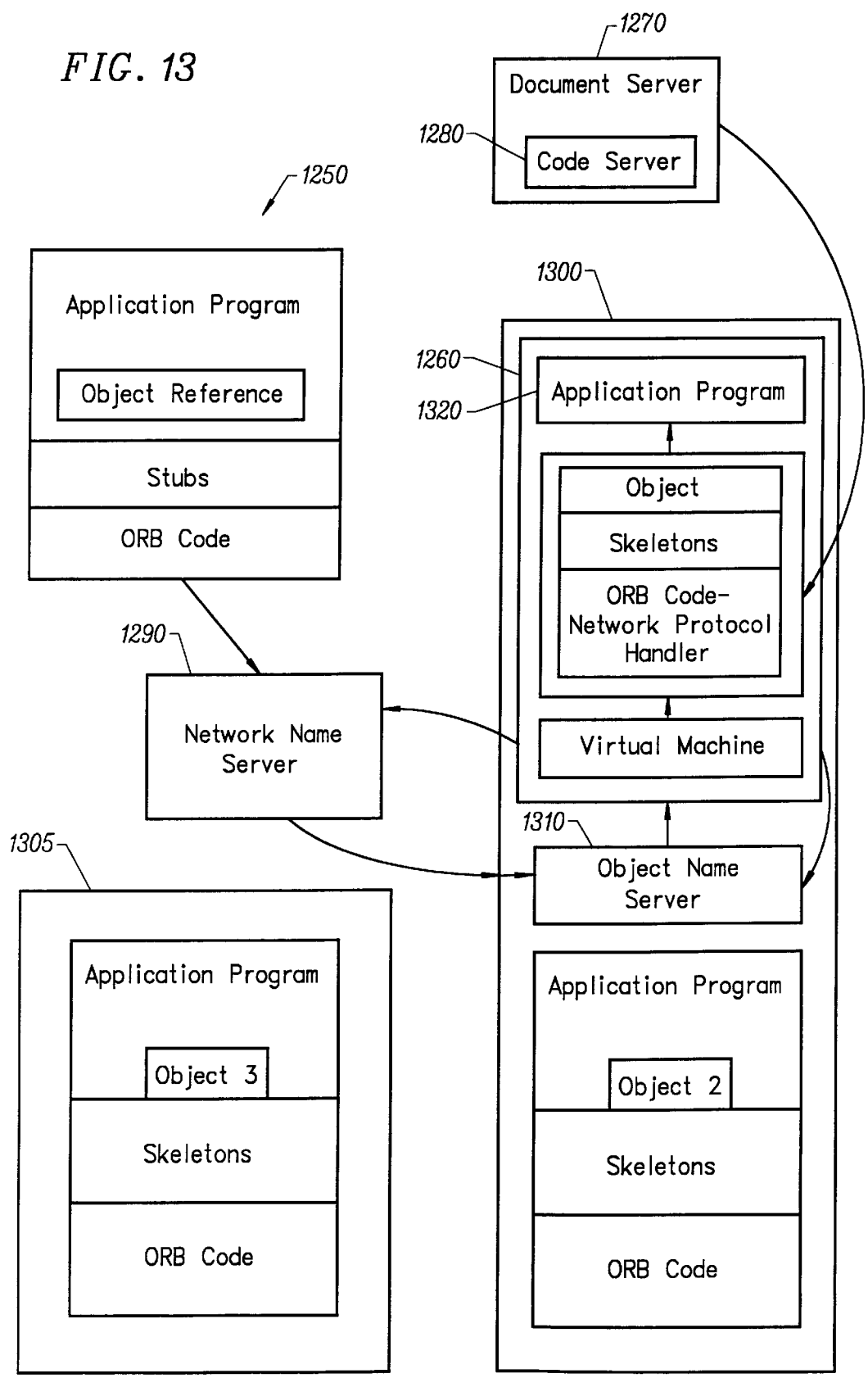
FIG. 13 is a graphic representation of the concepts of a network name server and an object name server.

FIG. 13 is a graphic representation of the concepts of a network name server and an object name server. FIG. 13 includes a network client 1250, a document server 1270, a code server 1280, a network name server 1290, network server machine 1300 and 1305, an object name server 1310, a network server 1260, and an application program 1320.

Network name servers such as network name server 1290, are servers that return a machine address for a network server in response to an inputted server name. Such network name servers are well known in the art. Object name servers such as object name server 1310, are servers that are resident in network server machines. Object name servers return references to network object servers in response to an inputted object name. Such object name servers are also well known in the art.

In operation, as described in conjunction with FIG. 11, code server 1280 downloads applets that enable application program 1320 to receive communications from network client 1250. Network client 1250, however may only be given the logical name for the network server 1260. Thus, in order to enable network client 1250 to find the network server machine within which network server 1260 resides, using the downloaded code, application program 1320 first "publishes" the object name and the network server machine address in network name server 1290.

As illustrated in FIG. 11, once network client 1250 has located network server machine 1300, network client 1250 typically refers to object name server 1310 to find a reference to network server 1260. Again, using the downloaded code, application program 1320 first "publishes" the object name and provides a pointer to the network server 1260.

It is noted that document server 1270 and code server 1280 may reside within the same physical machine.

Figure 14:
FIG. 14 is an example of a potential end user application incorporating the preferred embodiment of the present invention; and Microfiche Appendix includes "The Java Language Specification," Release 1.0 alpha3, May 11, 1995.

FIG. 14 is an example of a potential end user application incorporating the preferred embodiment of the present invention. FIG. 14 includes a display of a document on a web browser and a plurality of buttons, such as button 1340.

In FIG. 14, the application program illustrated is an Internet browser, such as HotJava. The application program has connected to a document server having the address "file:://localhost/export/JOE/stock.html" and the document is displayed to the user as shown in FIG. 14. The document illustrates an order display page in a brokerage trading system where the user can place orders for a stock. Unbeknownst to the application program, the brokerage trading system is an object-oriented network client/server.

When the user wishes to place an order for a stock at a certain price, the user selects button 1340. The server application transmits the users selection of button 1340 to the document server, and in response, the document server has an associated code server download Java language applets to the application program. After the applets have been downloaded, the application program executes the applets. These applets contain object skeletons, ORB specific code including the particular network protocol of the brokerage trading system, etc. In response to a trade command, for example, the application program creates an "trade" object. The user may then exit the web browser. Later, when the trade has executed, the brokerage trading system calls up the user's machine and invokes a method on the "trade" object in the application program to notify the user that the trade is complete.

CONCLUSION

In the foregoing specification, the invention has been described with reference to specific exemplary embodiments thereof. Many changes or modifications are readily envisioned. For example, the application programs may be object-oriented or programmed in C++; the code that is downloaded may be machine dependent or specific; the code that is downloaded may only contain the network protocol for the network server; the code that is downloaded may only contain the network protocol for the network client; the document server, code server, and the network server may be located at the same address space or in the same physical computer; the document server, code server, and the network client may be located at the same address space or in the same physical computer; etc.

The specification and drawings are, accordingly, to be regarded in an illustrative rather than in a restrictive sense. It will, however, be evident that various modifications and changes may be made thereunto without departing from the broader spirit and scope of the invention as set forth in the claims.

APPENDIX A
08/543674
The Java Language Specification
*Release 1.0 Alpha3*
Sun Microsystems Computer Corporation
A Sun Microsystems, Inc. Business
May 11, 1995

© 1993, 1994, 1995 Sun Microsystems, Inc.
2550 Garcia Avenue, Mountain View, California 94043-1100 U.S.A.

All rights reserved. This ALPHA quality release and related documentation are protected by copyright and distributed under licenses restricting its use, copying, distribution, and decompilation. No part of this release or related documentation may be reproduced in any form by any means without prior written authorization of Sun and its licensors, if any.

Portions of this product may be derived from the UNIX® and Berkeley 4.3 BSD systems, licensed from UNIX System Laboratories, Inc. and the University of California, respectively. Third-party font software in this release is protected by copyright and licensed from Sun's Font Suppliers.

RESTRICTED RIGHTS LEGEND: Use, duplication, or disclosure by the United States Government is subject to the restrictions set forth in DFARS 252.227-7013 (c)(1)(ii) and FAR 52.227-19.

The release described in this manual may be protected by one or more U.S. patents, foreign patents, or pending applications.

TRADEMARKS
Sun, Sun Microsystems, Sun Microsystems Computer Corporation, the Sun logo, the Sun Microsystems Computer Corporation logo, WebRunner, Java, FirstPerson and the FirstPerson logo and agent are trademarks or registered trademarks of Sun Microsystems, Inc. The "Duke" character is a trademark of Sun Microsystems, Inc. and Copyright (c) 1992-1995 Sun Microsystems, Inc. All Rights Reserved. UNIX® is a registered trademark in the United States and other countries, exclusively licensed through X/Open Comapny, Ltd. OPEN LOOK is a registered trademark of Novell, Inc. All other product names mentioned herein are the trademarks of their respective owners.

All SPARC trademarks, including the SCD Compliant Logo, are trademarks or registered trademarks of SPARC International, Inc. SPARCstation, SPARCserver, SPARCengine, SPARCworks, and SPARCompiler are licensed exclusively to Sun Microsystems, Inc. Products bearing SPARC trademarks are based upon an architecture developed by Sun Microsystems, Inc.

The OPEN LOOK® and Sun™ Graphical User Interfaces were developed by Sun Microsystems, Inc. for its users and licensees. Sun acknowledges the pioneering efforts of Xerox in researching and developing the concept of visual or graphical user interfaces for the computer industry. Sun holds a non-exclusive license from Xerox to the Xerox Graphical User Interface, which license also covers Sun's licensees who implement OPEN LOOK GUIs and otherwise comply with Sun's written license agreements.

X Window System is a trademark and product of the Massachusetts Institute of Technology.

THIS PUBLICATION IS PROVIDED "AS IS" WITHOUT WARRANTY OF ANY KIND, EITHER EXPRESS OR IMPLIED, INCLUDING, BUT NOT LIMITED TO, THE IMPLIED WARRANTIES OF MERCHANTABILITY, FITNESS FOR A PARTICULAR PURPOSE, OR NON-INFRINGEMENT.

THIS PUBLICATION COULD INCLUDE TECHNICAL INACCURACIES OR TYPOGRAPHICAL ERRORS. CHANGES ARE PERIODICALLY ADDED TO THE INFORMATION HEREIN; THESE CHANGES WILL BE INCORPORATED IN NEW EDITIONS OF THE PUBLICATION. SUN MICROSYSTEMS, INC. MAY MAKE IMPROVEMENTS AND/OR CHANGES IN THE PRODUCT(S) AND/OR THE PROGRAM(S) DESCRIBED IN THIS PUBLICATION AT ANY TIME.

Please
Recycle

Contents

Java Language Specification.................................................... 1

1    Program Structure............................................... 1

2    Lexical Issues..................................................... 1
     2.1    Comments................................................ 2
     2.2    Identifiers................................................ 2
     2.3    Keywords................................................. 2
     2.4    Literals.................................................... 3
     2.5    Operators and Miscellaneous Separators....................... 4

3    Types............................................................. 4
     3.1    Numeric Types........................................... 5
     3.2    Boolean Types............................................ 6
     3.3    Arrays.................................................... 6

4    Classes............................................................ 7
     4.1    Casting Between Class Types................................ 8
     4.2    Methods.................................................. 9
     4.3    Overriding Methods....................................... 11
     4.4    Overload Resolution....................................... 11
     4.5    Constructors.............................................. 12
     4.6    Object Creation—the new Operator.......................... 14
     4.7    Static Methods, Variables, and Initializers..................... 15
     4.8    Access Specifiers.......................................... 17
     4.9    Variable Scoping Rules.................................... 17
     4.10   Modifiers................................................. 18

5    Interfaces........................................................ 20
     5.1    Interfaces as Types........................................ 21
     5.2    Methods in Interfaces...................................... 21
     5.3    Variables in Interfaces..................................... 21
     5.4    Combining Interfaces..................................... 21

6    Packages......................................................... 21
     6.1    Specifying a Compilation Unit's Package..................... 22
     6.2    Using Classes and Interfaces from Other Packages............. 22

7    Expressions...................................................... 22
     7.1    Operators................................................ 23
     7.2    Casts and Conversions.................................... 26

| 8   | Statements | 26 |
|-----|-----------|----|
| 8.1 | Declarations | 26 |
| 8.2 | Expressions | 26 |
| 8.3 | Control Flow | 27 |
| 8.4 | Exceptions | 27 |
| A   | Appendix: Floating Point | 33 |
| A.1 | Special Values | 33 |
| A.2 | Binary Format Conversion | 33 |
| A.3 | Ordering | 34 |
| A.4 | Summary of IEEE-754 Differences | 34 |
| B   | Appendix: Java Language Grammar | 35 |

Java Language Specification

This document is a preliminary specification of the Java™ language. Both the specification and the language are subject to change. When a feature that exists in both Java and ANSI C isn't explained fully in this specification, the feature should be assumed to work as it does in ANSI C. Send comments on the Java Language and specification to java@java.Sun.COM. See also http://java.sun.com/mail.html for a list of Java-related mailing lists.

1 Program Structure

The source code for an Java program consists of one or more *compilation units*. Each compilation unit can contain only the following (in addition to white space and comments):

- a package statement (see "Packages" on page 21)
- import statements (see "Packages" on page 21)
- class declarations (see "Classes" on page 7)
- interface declarations (see "Interfaces" on page 20)

Although each Java compilation unit can contain multiple classes or interfaces, at most one class or interface per compilation unit can be public (see "Classes" on page 7).

When Java source code is compiled, the result is Java bytecode. Java bytecode consists of machine-independent instructions that can be interpreted efficiently by the Java runtime system. The Java runtime system operates like a virtual machine, for information see *The Java Virtual Machine Specification*.

Implementation Note: In the current Java implementation, each compilation unit is a file with a ".java" suffix.

2 Lexical Issues

During compilation, the characters in Java source code are reduced to a series of tokens. The Java compiler recognizes five kinds of tokens: identifiers, keywords, literals, operators, and miscellaneous separators. Comments and *white space* such as blanks, tabs, line feeds, and are not tokens, but they often are used to separate tokens.

Java programs are written using the Unicode character set or some character set that is converted to Unicode before being compiled.

2 Lexical Issues

2.1 Comments

The Java language has three styles of comments:

| | |
|---|---|
| `// text` | All characters from // to the end of the line are ignored. |
| `/* text */` | All characters from /* to */ are ignored. |
| `/** text */` | These comments are treated specially when they occur immediately before any declaration. They should not be used any other place in the code. These comments indicate that the enclosed text should be included in automatically generated documentation as a description of the declared item. |

2.2 Identifiers

Identifiers must start with a letter, underscore ("_"), or dollar sign ("$"); subsequent characters can also contain digits (0-9). Java uses the Unicode character set. For the purposes of determining what is a legal identifier the following are considered "letters:"

- The characters "A" through "Z"
- The characters "a" through "z"
- All Unicode characters with a character number above hex 00C0

Other characters valid after the first letter of an identifier include every character except those in the segment of Unicode reserved for special characters.

Thus, "garçon" and "Mjølner" are legal identifiers, but strings containing characters such as "¶" are not.

For more information on the Unicode standard, see *The Unicode Standard, Worldwide Character Encoding*, Version 1.0, Volumes 1&2. The FTP address for Unicode, Inc. (formerly the Unicode Consortium) is unicode.org.

2.3 Keywords

The following identifiers are reserved for use as keywords. They cannot be used in any other way.

| | | | | |
|---|---|---|---|---|
| abstract | default | goto[a] | null | synchronized |
| boolean | do | if | package | this |
| break | double | implements | private | threadsafe |
| byte | else | import | protected | throw |
| byvalue[a] | extends | instanceof | public | transient |
| case | false | int | return | true |
| catch | final | interface | short | try |
| char | finally | long | static | void |
| class | float | native | super | while |
| const[a] | for | new | switch | |
| continue | | | | | a. Reserved but currently unused.

2 Lexical Issues

2.4 Literals

Literals are the basic representation of any integer, floating point, boolean, character, or string value.

2.4.1 *Integer Literals*

Integers can be expressed in decimal (base 10), hexadecimal (base 16), or octal (base 8) format. A decimal integer literal consists of a sequence of digits (optionally suffixed as described below) *without* a leading 0 (zero). An integer can be expressed in octal or hexadecimal rather than decimal. A leading 0 (zero) on an integer literal means it is in octal; a leading 0x (or 0X) means hexadecimal. Hexadecimal integers can include digits (0-9) and the letters a-f and A-F. Octal integers can include only the digits 0-7.

Integer literals are of type int unless they are larger than 32-bits, in which case they are of type long (see "Integer Types" on page 5). A literal can be forced to be long by appending an L or l to its value.

The following are all legal integer literals:

```
2, 2L  0777  0xDeadBeef
```

2.4.2 *Floating Point Literals*

A floating point literal can have the following parts: a decimal integer, a decimal point ("."), a fraction (another decimal number), an exponent, and a type suffix. The exponent part is an e or E followed by an integer, which can be signed. A floating point literal must have at least one digit, plus either a decimal point or e (or E). Some examples of floating point literals are:

```
3.1415 3.1E12  .1e12  2E12
```

As described in "Floating Point Types" on page 5, the Java language has two floating point types: float (IEEE 754 single precision) and double (IEEE 754 double precision). You specify the type of a floating point literal as follows:

```
2.0d or 2.0D            double
2.0f or 2.0F or 2.0     float
```

2.4.3 *Boolean Literals*

The boolean type has two literal values: true and false. See "Boolean Types" on page 6 for more information on boolean values.

2.4.4 *Character Literals*

A character literal is a character (or group of characters representing a single character) enclosed in single quotes. Characters have type char and are drawn from the Unicode character set (see "Character Types" on page 5). The following escape sequences allow for the representation of some non-graphic characters as well as the single quote, "'" and the backslash "\", in Java code:

| | | |
|---:|---|---|
| continuation | <newline> | \ |
| new-line | NL (LF) | \n |
| horizontal tab | HT | \t |
| back space | BS | \b |
| carriage return | CR | \r |
| form feed | FF | \f |
| backslash | \ | \\ |
| single quote | ' | \' |
| double quote | " | \" |
| octal bit pattern | 0ddd | \ddd |
| hex bit pattern | 0xdd | \xdd |
| unicode char | 0xdddd | \udddd |

2.4.5 String Literals

A string literal is zero or more characters enclosed in double quotes. Each string literal is implemented as a String object (*not* as an array of characters). For example, "abc" creates an new instance of class String. The following are all legal string literals:

```
""  \\ the empty string
"\""
"This is a string"
"This is a \
    two-line string"
```

2.5 Operators and Miscellaneous Separators

The following characters are used in source code as operators or separators:

```
+   -   !   %   ^   &   *   |   ~   /   >   <
( )   { }   [ ]   ;   ?   :   ,   .   =
```

In addition, the following character combinations are used as operators:

```
++    --    ==    <=    >=    !=    <<    >>
>>>   +=    -=    *=    /=    &=    |=
^=    %=    <<=   >>=   >>>=   ||    &&
```

For more information see "Operators" on page 23.

3  *Types*

Every variable and every expression has a type. Type determines the allowable range of values a variable can hold, allowable operations on those values, and the 3 Types meanings of the operations. Built-in types are provided by the Java language. Programmers can compose new types using the *class* and *interface* mechanisms (see "Classes" on page 7 and "Interfaces" on page 20).

The Java language has two kinds of types: simple and composite. Simple types are those that cannot be broken down; they are atomic. The integer, floating point, boolean, and character types are all simple types. Composite types are built on simple types. The language has three kinds of composite types: arrays, classes, and interfaces. Simple types and arrays are discussed in this section.

3.1 Numeric Types

3.1.1 *Integer Types*

Integers are similar to those in C and C++, with two exceptions: all integer types are machine independent, and some of the traditional definitions have been changed to reflect changes in the world since C was introduced. The four integer types have widths of 8, 16, 32, and 64 bits and are signed.

| Width | Name |
|-------|------|
| 8 | byte |
| 16 | short |
| 32 | int |
| 64 | long |

A variable's type does not directly affect its storage allocation. Type only determines a variable's arithmetic properties and legal range of values. If a value is assigned to a variable that is outside the legal range of the variable, the value is reduced modulo the range.

3.1.2 *Floating Point Types*

The float keyword denotes single precision (32 bit); double denotes double precision (64 bit). The result of a binary operator on two float operands is a float. If either operand is a double, the result is a double.

Floating point arithmetic and data formats are defined by IEEE 754. See "Appendix: Floating Point" on page 33 for details on the floating point implementation.

3.1.3 *Character Types*

The language uses the Unicode character set throughout. Consequently the char data type is defined as a 16-bit unsigned integer.

3 Types

3.2 Boolean Types

The boolean type is used for variables that can be either true or false, and for methods that return true and false values. It's also the type that is returned by the relational operators (e.g., ">=").

Boolean values are not numbers and cannot be converted into numbers by casting.

3.3 Arrays

Arrays in the language are first class objects. They replace pointer arithmetic. All objects (including arrays) are referred to by pointers that cannot be damaged by being manipulated as numbers. Arrays are created using the new operator:

```
char s[] = new char[30];
```

The first element of an array is at index 0 (zero). Specifying dimensions in the declarations is not allowed. Every allocation of an array must be explicit—use new every time:

```
int i[] = new int[3];
```

The language does not support multi-dimensional arrays. Instead, programmers can create arrays of arrays:

```
int i[][] = new int[3][4];
```

At least one dimension must be specified but other dimensions can be explicitly allocated by a program at a later time. For example:

```
int i[][] = new int[3][];
``` is a legal declaration.

In addition to the C-style array declaration, where brackets follow the name of the variable or method, Java allows brackets following the array element type. The following two lines are equivalent:

```
int iarray[];
int[] iarray;
``` as are the following method declarations:

```
byte   f( int n )[];
byte[] f( int n );
```

Subscripts are checked to make sure they're valid:

```
int a[] = new int[10];
a[5] = 1;
a[1] = a[0] + a[2];
a[-1]  = 4;            // Throws an ArrayIndexOutOfBoundsException
                       // at runtime
a[10] = 2;             // Throws an ArrayIndexOutOfBoundsException
                       // at runtime
```

Array dimensions must be integer expressions:

```
int n;
...
```

4 Classes

```
float arr[] = new float[n + 1];
```

The length of any array can be found by using .length:

```
int a[][] = new int[10][3];
println(a.length);         // prints 10
println(a[0].length);      // prints 3
```

3.3.1 Array Detail

Arrays are instances of subclasses of class Object. In the class hierarchy there is a class named Array, which has one instance variable, "length". For each primitive type there is a corresponding subclass of Array. Similarly, for all classes a corresponding subclass of Array implicitly exists. For example:

```
new Thread[n]
``` creates an instance of Thread[]. If class A is a superclass of class B (i.e., B extends A) then A[] is a superclass of B[] (see the diagram below).

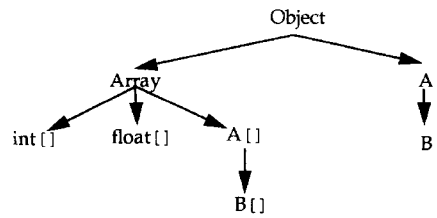

Hence, you can assign an array to an Object:

```
Object o;
int a[] = new int[10];
o = a;
``` and you can cast an Object to an array:

```
a = (int[])o;
```

Array classes cannot be explicitly subclassed.

4 Classes

Classes represent the classical object oriented programming model. They support data abstraction and implementations tied to data. In Java, each new class creates a new type.

To make a new class, the programmer must base it on an existing class. The new class is said to be *derived* from the existing class. The derived class is also called a *subclass* of the other, which is known as a *superclass*. Class derivation is transitive: if B is a subclass of A, and C is a subclass of B, then C is a subclass of A.

4 Classes

The immediate superclass of a class and the interfaces (see "Interfaces" on page 20) that the class implements (if any) are indicated in the class declaration by the keywords extends and implements, respectively:

*[Doc comment] [Modifiers]* class *Classname*
    extends *Superclassname]*
    implements *Interface[, Interface]] {*
        *ClassBody*
*}*

For example:

```
/** 2 dimensional point */
public class Point {
    float x, y;
    ...
}

/** Printable point */
class PrintablePoint extends Points implements Printable {
    ...
    public void print() {
        ...
    }
}
```

All classes are derived from a single root class: Object. Every class except Object has exactly one immediate superclass. If a class is declared without specifying an immediate superclass, Object is assumed. For example, the following:

```
class Point {
    float x, y;
}
``` is the same as:

```
class Point extends Object {
    float x, y;
}
```

The language supports only single inheritance. Through a feature known as *interfaces*, it supports some features that in other languages are supported through multiple inheritance (see "Interfaces" on page 20).

4.1 Casting Between Class Types

The language supports casting between types and because each class is a new type, Java supports casting between class types. If B is a subclass of A, then an instance of B can be used as an instance of A. No explicit cast is required, but an explicit cast is legal—this is called *widening*. If an instance of A needs to be used as if it were an instance of B, the programmer can write a type conversion or *cast*—this is called *narrowing*. Casts from a class to a subclass are always checked at runtime to make sure that the object is actually an instance of the subclass (or one of its subclasses). Casting between sibling classes is a compile-time error. The syntax of a class cast is:

```
(classname) ref
``` where (classname) is the object being cast to and ref is the object being cast.

4 Classes

Casting affects only the reference to the object, not the object itself. However, access to instance variables is affected by the type of the object reference. Casting an object from one type to another may result in a different instance variable being accessed even though the same variable name is used.

```java
class ClassA {
    String name = "ClassA";
} class ClassB extends ClassA {   // ClassB is a subclass of ClassA
    String name= "ClassB";
} class AccessTest {
    void test() {
        ClassB b = new ClassB();
        println(b.name);          // print: ClassB ClassA a;
        a = (ClassA)b;
        println(a.name);          // print: ClassA
    }
}
```

4.2 Methods

Methods are the operations that can be performed on an object or class. They can be declared in either classes or interfaces, but they can be implemented only in classes. (All user-defined operations in the language are implemented with methods.)

A method declaration in a class has the following form (native and abstract methods have no method body):

*[Doc comment] [Modifiers] returnType methodName ( parameterList ) {*
   *[methodBody]*
*}*

Methods:

- Have a return type unless they're constructors, in which case they have no return type. If a non-constructor method does not return any value, it must have a void return type.
- Have a parameter list consisting of comma-separated pairs of types and parameter names. The parameter list should be empty if the method has no parameters.

Variables declared in methods (*local variables*) can't hide other local variables or parameters in the same method. For example, if a method is implemented with a parameter named i, it's a compile-time error for the method to declare a local variable named i. In the following example:

```java
class Rectangle {
    void vertex(int i, int j) {
        for (int i = 0; i <= 100; i++) { // ERROR
            ...
        }
    }
}
```

4 Classes the declaration of "i" in the for loop of the method body of "vertex" is a compile-time error.

The language allows *polymorphic* method naming—declaring a method with a name that has already been used in the class or its superclass—for overriding and overloading methods. *Overriding* means providing a different implementation of an inherited method. *Overloading* means declaring a method that has the same name as another method, but a different parameter list.

Note: Return types are not used to distinguish methods. Within a class scope, methods that have the same name and parameter list, i.e., the same number, position, and types of parameters, *must* return the same type. It is a compile-time error to declare such a method with a different return type.

4.2.1 Instance Variables

All variables in a class declared outside the scope of a method and not marked static (see "Static Methods, Variables, and Initializers" on page 15) are instance variables. (Variables declared inside the scope of a method are considered local variables.) Instance variables can have modifiers (see "Modifiers" on page 18).

Instance variables can be of any type and can have initializers. If an instance variable does not have an initializer, it is initialized to zero; boolean variables are initialized to false; and objects are initialized to null. An example of an initializer for an instance variable named j is:

```
class A {
    int j = 23;
    ...
}
```

4.2.2 The this and super Variables

Inside the scope of a non-static method, the name this represents the current object. For example, an object may need to pass itself as an argument to another object's method:

```
class MyClass {
    void aMethod(OtherClass obj) {
        ...
        obj.Method(this);
        ...
    }
}
```

Any time a method refers to its own instance variables or methods, an implicit "this." is in front of each reference:

```
class Foo {
    int a, b, c;
    ...
    void myPrint(){
        print(a + "\n");    // a == "this.a"
    }
    ...
}
```

The super variable is similar to the this variable. The this variable contains a reference to the current object; its type is the class containing the currently 4 Classes executing method. The super variable contains a reference which has the type of the superclass.

4.2.3 Setting Local Variables

Methods are rigorously checked to be sure that all *local variables* (variables declared inside a method) are set before they are referenced. Using a local variable before it is initialized is a compile-time error.

4.3 Overriding Methods

To override a method, a subclass of the class that originally declared the method must declare a method with the same name, return type (or a subclass), and parameter list. When the method is invoked on an instance of the subclass, the new method is called rather than the original method. The overridden method can be invoked using the super variable such that:

```
setThermostat(...)          // refers to the overriding method
super.setThermostat(...)    // refers to the overridden method
```

4.4 Overload Resolution

Overloaded methods have the same name as an existing method, but differ in the number and/or the types of arguments. Overload resolution involves determining which overloaded method to invoke. The return type is not considered when resolving overloaded methods. Methods may be overloaded within the same class. The order of method declaration within a class is not significant.

Methods may be overloaded by varying both the number and the type of arguments. The compiler determines which matching method has the lowest type conversion cost. Only methods with the same name and number of arguments are considered for matching. The cost of matching a method is the maximum cost of converting any one of its arguments. There are two types of arguments to consider:, object types and base types.

The cost of converting among object types is the number of links in the class tree between the actual parameter's class and the prototype parameter's class. Only widening conversions are considered. (See "Casting Between Class Types" on page 8 for more information on object conversion.) No conversion is necessary for argument types that match exactly, making their cost 0.

4 Classes

The cost of converting base types is calculated from the table below. Exact matches cost 0.

|  |  | To | | | | | | |
|---|---|---|---|---|---|---|---|---|
|  |  | byte | short | char | int | long | float | double |
| From | byte | 0 | 1 | 2 | 3 | 4 | 6 | 7 |
|  | short | 10 | 0 | 10 | 1 | 2 | 4 | 5 |
|  | char | 11 | 10 | 0 | 1 | 2 | 4 | 5 |
|  | int | 12 | 11 | 11 | 0 | 1 | 5 | 4 |
|  | long | 12 | 11 | 11 | 10 | 0 | 6 | 5 |
|  | float | 15 | 14 | 13 | 12 | 11 | 0 | 1 |
|  | double | 16 | 15 | 14 | 13 | 12 | 10 | 0 |

Note: Cost >= 10 causes data loss.

Once a conversion cost is assigned to each matching method, the compiler chooses the method which has the lowest conversion cost. If there is more than one potential method with the same lowest cost the match is ambiguous and a compile-time error occurs.

For example:

```
class A {
    int method(Object o, Thread t);
    int method(Thread t, Object o);

void g(Object o, Thread t) {
        method(o, t);    // calls the first method.
        method(t, o);    // calls the second method.
        method(t, t);    // ambiguous - compile-time error
    }
}
```

Note: The names of parameters are not significant. Only the number, type, and order are.

4.5 Constructors

Constructors are special methods provided for initialization. They are distinguished by having the same name as their class and by not having any return type. Constructors are automatically called upon the creation of an object. They cannot be called explicitly through an object. If you want to be able to call the constructor outside the package, make the constructor public (see "Access Specifiers" on page 17 for more information).

Constructors can be overloaded by varying the number and types of parameters, just as any other method can be overloaded.

```
class Foo {
    int x;
    float y;
    Foo() {
        x = 0;
        y = 0.0;
    }
```

4 Classes

```
Foo(int a) {
    x = a;
    y = 0.0;
}
Foo(float a) {
    x = 0;
    y = a;
}
Foo(int a, float b) {
    x = a;
    y = b;
}
static void myFoo() {
    Foo obj1 = new Foo();         //calls Foo();
    Foo obj2 = new Foo(4);        //calls Foo(int a);
    Foo obj3 = new Foo(4.0);      //calls Foo(float a);
    Foo obj4 = new Foo(4, 4.0);   //calls Foo(int a, float b);
}
}
```

The instance variables of superclasses are initialized by calling either a constructor for the immediate superclass or a constructor for the current class. If neither is specified in the code, the superclass constructor that has no parameters is invoked. If a constructor calls another constructor in this class or a constructor in the immediate super class, that call must be the first thing in the constructor body. Instance variables can't be referenced before calling the constructor.

Invoking a constructor of the immediate superclass is done as follows:

```
class MyClass extends OtherClass {
    MyClass(someParameters) {
        /* Call immediate superclass constructor */
        super(otherParameters);
        ...
    }
    ...
}
```

Invoking a constructor in the current class is done as follows:

```
class MyClass extends OtherClass {
    MyClass(someParameters) {
        ...
    }
    MyClass(otherParameters) {
        /* Call the constructor in this class that has the
           specified parameter list. */
        this(someParameters);
        ...
    }
    ...
}
```

The Foo and FooSub methods below are examples of constructors.

```
class Foo extends Bar {
    int a;
    Foo(int a) {
        // implicit call to Bar()
        this.a = a;
    }
    Foo() {
        this(42);         // calls Foo(42) instead of Bar()
    }
} class FooSub extends Foo {
    int b;
```

May 11 1995     Java Language Specification

4 Classes

```
FooSub(int b) {
    super(13);      // calls Foo(13); without this line,
                    // would have called Foo()
    this.b = b;
    }
}
```

If a class declares no constructors, the compiler automatically generates one of the following form:

```
class MyClass extends OtherClass {
    MyClass() {    // automatically generated
        super();
    }
}
```

4.6 Object Creation—the new Operator

A class is a template used to define the state and behavior of an object. An *object* is an *instance* of a class. All instances of classes are allocated in a garbage collected heap. Declaring a reference to an object does not allocate any storage for that object. The programmer must explicitly allocate the storage for objects, but no explicit deallocation is required; the garbage collector automatically reclaims the memory when it is no longer needed.

To allocate storage for an object, use the new operator. In addition to allocating storage, new initializes the instance variables and then calls the instance's constructor. The constructor is a method that initializes an object (see "Constructors" on page 12). The following syntax allocates and initializes a new instance of a class named ClassA:

```
a = new ClassA();
```

This constructor syntax provides arguments to the constructor:

```
b = new ClassA(3,2);
```

A third form of allocator allows the class name to be provided as a String expression. The String is evaluated at runtime, and new returns an object of type Object, which must be cast to the desired type.

```
b = new ( "Class"+"A" );
```

In this case, the constructor without arguments is called.

4.6.1 Garbage Collection

The garbage collector makes most aspects of storage management simple and robust. Programs never need to explicitly free storage: it is done for them automatically. The garbage collector never frees pieces of memory that are still referenced, and it always frees pieces that are not. This makes both dangling pointer bugs and storage leaks impossible. It also frees designers from having to figure out which parts of a system have to be responsible for managing storage.

4.6.2 Finalization

The Java language includes the concept of object finalization. Java finalization is generalization of garbage collection that allows a program to free arbitrary

4 Classes resources (e.g., file descriptors or graphics contexts) owned by objects that cannot be accessed by any Java program. Reclaiming an object's memory by garbage collection does not guarantee that these resources will be reclaimed[1].

4.6.3 The null Reference

The keyword null is a predefined constant that represents "no instance." null can be used anywhere an instance is expected and can be cast to any class type.

4.7 Static Methods, Variables, and Initializers

Variables and methods declared in a class can be declared static, which makes them apply to the class itself, rather than to an instance of the class. In addition, a block of code within a class definition can be declared static. Such a block of code is called a static initializer.

Static variables can have initializers, just as instance variables can. See "Order of Initialization" on page 16 for more information. A static variable exists only once per class, no matter how many instances of the class exist. Both static variables and static methods are accessed using the class name. For convenience, they can also be accessed using an instance of the class.

```
class Ahem {
    int i;                              // Instance variable
    static int j;                       // Static variable
    static int arr[] = new int[12];
    static {                            // static initializer:
                                        // initialize the array
        for (int i = 0; i < arr.length; i++) {
            arr[i] = i;
        }
    }
    void seti(int i) {                  // Instance method
        this.i = i;
    }
    static void setj(int j) {           // Static method
        Ahem.j = j;
    }
    static void clearThroat() {
        Ahem a = new Ahem();
        Ahem.j = 2;        // valid; static var via class
        a.j = 3;           // valid; static var via instance
        Ahem.setj(2);      // valid; static method via class
        a.setj(3);         // valid; static method via instance
        a.i = 4;           // valid; instance var via instance
        Ahem.i = 5;        // ERROR; instance var via class
        a.seti(4);         // valid; instance method via instance
        Ahem.seti(5);      // ERROR; instance method via class
    }
}
```

---

1. When a user defines the void finalize() method in a class definition, finalization is enabled for objects of that class. Finalization of an object consists of the system calling the object's finalize() method. Finalization normally occurs asynchronously at some time after the garbage collection mechanism identifies an object as inaccessible. Users can invoke their finalize() method explicitly but this doesn't guarantee that the system will not call it again at a later time. If a finalized object references another finalized object, the objects are finalized in the reverse order of their creation. Java does not guarantee when or if a given finalized object will have its finalize() method called. Thus, finalization should not be relied on for program correctness. Rather, finalization should be thought of as an optimization.

4.7.1 Order of Declarations

The order of declaration of classes and the methods and instance variables within them is irrelevant. However, it is possible for cycles to exist during initialization. For information on cycles during initialization see "Order of Initialization" on page 16. Methods are free to make forward references to other methods and instance variables. The following is legal:

```
class A {
    void a() {
        f.set(42);
    }
    B f;
}
class B {
    void set(long n) {
        this.n = n; }
    long n;
}
```

4.7.2 Order of Initialization

When a class is loaded, all of its static initialization code is executed. Static initializers are executed at the same time that static variables are initialized. The initializations occur in lexical order. For example, a class C is declared as follows:

```
class C {
    static int a = 1;
    static {
        a++;
        b = 7;
    }
    static int b = 2;
}
```

When class C is loaded, the following occurs in order:

- a is set to 1
- the static initializer is executed, setting a to 2 and b to 7
- b is set to 2

If any static initialization code has a reference to some other, unloaded class, that class is loaded and its static initialization code is executed first. Each unloaded class referenced during static initialization is loaded and initialized before the class that referenced it. If at any time during this initialization sequence a reference is made to an uninitialized class that is earlier in the sequence, a cycle is created. A cycle causes a NoClassDefFoundException to be thrown.

For example, if ClassA is loaded, its static initialization code is executed. However, ClassA's static initialization code can have a reference to another unloaded class, for example, ClassB. In that case, ClassB is loaded and its static initialization occurs before ClassA's. Then, ClassA's static initializations are executed. A cycle is created if ClassB has a reference to ClassA in its static initialization code.

It is an compile-time error for instance or static variable initializations to have a forward dependency. For example, the following code:

```
int i = j + 2;
int j = 4;
```

4 Classes results in a compile-time error.

An instance variable's initialization can have an apparent forward dependency on a static variable. For example in the following code fragment:

```
int i = j + 2;          // Instance variable
static int j = 4;       // Static variable
``` it appears that i has a forward dependency on j. However, i is initialized to 6 and j is initialized to 4. This initialization occurs because j is a static variable and is initalized before the instance variable. Thus, j is initialized to 4 before i is initialized.

Static methods cannot refer to instance variables; they can only use static variables and static methods.

4.8 Access Specifiers

Access specifiers are modifiers that allow programmers to control access to methods and variables. The keywords used to control access are public, private, and protected. Methods marked as public can be accessed from anywhere by anyone. Methods marked as private can be accessed only from within the class in which they are declared. Since private methods are not visible outside the class, they are effectively final and cannot be overridden (see "Final Classes, Methods, and Variables" on page 18 for more information). Moreover, you cannot override a non-private method and give it private access. The protected access specifier makes a variable or method accessible to subclasses, but not to any other classes.

Public access can be applied to classes, methods, and variables. Classes, methods, and variables marked as public can be accessed from anywhere by any other class or method. The access of a public method cannot be changed by overriding it.

Classes, methods, and variables that do not have either private or public access specified can be accessed only from within the package where they are declared (see "Packages" on page 21).

4.9 Variable Scoping Rules

Within a package, when a class is defined as a subclass of another, declarations made in the superclass are visible in the subclass. When a variable is referenced inside a method definition, the following scoping rules are used:

1. The current block is searched first, and then all enclosing blocks, up to and including the current method. This is considered the local scope.

After the local scope, the search continues in the class scope:

2. The variables of the current class are searched.

4 Classes

3. If the variable is not found, variables of all superclasses are searched, starting with the immediate superclass, and continuing up through class Object until the variable is found. If the variable is not found, imported classes and package names are searched. If it is not found, it is a compile-time error.

Multiple variables with the same name within the same class are not allowed and result in a compile-time error.

4.10 Modifiers

4.10.1 *Threadsafe Variables*

An instance or static variable can be marked threadsafe to indicate that the variable will never be changed by some other thread while one thread is using it, i.e., the variable never changes asynchronously. The purpose of marking a variable as threadsafe is to allow the compiler to perform some optimizations that may mask the occurrence of asynchronous changes. The primary optimization enabled by the use of threadsafe is the caching of instance variables in registers.

4.10.2 *Transient Variables*

The transient flag is available to the interpreter and is intended to be used for persistent objects. Variables marked transient are treated specially when instances of the class are written out as persistent objects.

4.10.3 *Final Classes, Methods, and Variables*

The final keyword is a modifier that marks a class as never having subclasses, a method as never being overridden, or a variable as having a constant value. It is a compile-time error to override a final method, subclass a final class, or change the value of a final variable. Variables marked as final behave like constants.

Using final lets the compiler perform a variety of optimizations. One such optimization is inline expansion of method bodies, which may be done for small, final methods (where the meaning of *small* is implementation dependent).

Examples of the various final declarations are:

```
class Foo {
    final int value = 3;              // f inal variable
    final int foo(int a, int b) {     // f inal method
        ...
    }
}
```

4.10.4 *Native Methods*

Methods marked as native are implemented in a platform-dependent language, e.g., C, not Java Native methods do not have a method body, instead the declaration is terminated with a semicolon. Constructors cannot be marked as native. Though implemented in a platform-dependent language, native methods 4 Classes behave exactly as non-native methods do, for example, it is possible to override them. An example of a native method declaration is:

```
native long timeOfDay();
```

4.10.5 *Abstract Methods*

Abstract methods provide the means for a superclass or interface to define a protocol that subclasses must implement. Methods marked as abstract must be defined in a subclass of the class in which they are declared. An abstract method does not have a method body; instead the declaration is terminated with a semi-colon.

The following rules apply to the use of the abstract keyword:

- Constructors cannot be marked as abstract.
- Static methods cannot be abstract.
- Private methods cannot be abstract.
- Abstract methods must be defined in some subclass of the class in which they are declared.
- A method that overrides a superclass method cannot be abstract.
- Classes that contains abstract methods and classes that inherit abstract methods without overriding them are considered abstract classes.
- It is a compile-time error to instantiate an abstract class or attempt to call an abstract method directly.

4.10.6 *Synchronized Methods and Blocks*

The synchronized keyword is a modifier that marks a method or block of code as being required to acquire a lock. The lock is necessary so that the synchronized code does not run at the same time as other code that needs access to the same resource. Each object has exactly one lock associated with it; each class also has exactly one lock. Synchronized methods are reentrant.

When a synchronized method is invoked, it waits until it can acquire the lock for the current instance (or class, if it's a static method). After acquiring the lock, it executes its code and then releases the lock.

Synchronized blocks of code behave similarly to synchronized methods. The difference is that instead of using the lock for the current instance or class, they use the lock associated with the object or class specified in the block's synchronized statement.

Synchronized blocks are declared as follows:

```
/* ...preceding code in the method... */
synchronized(<object or class name>) {      //sync. block
    /* code that requires synchronized access */
}
/* ...remaining code in the method... */
```

An example of the declaration of a synchronized method is:

```
class Point {
    float x, y;
    synchronized void scale(float f) {
```

5 Interfaces

```
        x *= f;
        y *= f;
    }
}
```

An example of a synchronized block is:

```
class Rectangle {
    Point topLeft;
    ...
    void print() {
        synchronized (topLeft) {
            println("topLeft.x = " + topLeft.x);
            println("topLeft.y = " + topLeft.y);
        }
        ...
    }
}
```

5  Interfaces

An interface specifies a collection of methods without implementing their bodies. Interfaces provide encapsulation of method protocols without restricting the implementation to one inheritance tree. When a class implements an interface, it generally must implement the bodies of all the methods described in the interface. (If the implementing class is abstract—never implemented—it can leave the implementation of some or all of the interface methods to its subclasses.)

Interfaces solve some of the same problems that multiple inheritance does without as much overhead at runtime. However, because interfaces involve dynamic method binding, there is a small performance penalty to using them.

Using interfaces allows several classes to share a programming interface without having to be fully aware of each other's implementation. The following example shows an interface declaration (with the interface keyword) and a class that implements the interface:

```
public interface Storing {
    void freezeDry(Stream s);
    void reconstitute(Stream s);
}
public class Image implements Storing, Painting {
    ...
    void freezeDry(Stream s) {
        // JPEG compress image before storing
        ...
    }
    void reconstitute (Stream s) {
        // JPEG decompress image before reading
        ...
    }
}
```

Like classes, interfaces are either private (the default) or public. The scope of public and private interfaces is the same as that of public and private classes, respectively. Methods in an interface are always public. Variables are public, static, and final.

5.1 Interfaces as Types

The declaration syntax *interfaceName variableName* declares a variable or parameter to be an instance of some class that implements *interfaceName*. Interfaces behave exactly as classes when used as a type. This lets the programmer specify that an object must implement a given interface, without having to know the exact type or inheritance of that object. Using interfaces makes it unnecessary to force related classes to share a common abstract superclass or to add methods to Object.

The following pseudocode illustrates the *interfaceName variableName* syntax:

```
class StorageManager {
    Stream stream;
    ...
    // Storing is the interface name
    void pickle(Storing obj) {
        obj.freezeDry(stream);
    }
}
```

5.2 Methods in Interfaces

Methods in interfaces are declared as follows:

*returnType methodName ( parameterList );*

The declaration contains no modifiers. All methods specified in an interface are public and abstract and no other modifiers may be applied.

See "Abstract Methods" on page 19 for more information on abstract methods.

5.3 Variables in Interfaces

Variables declared in interfaces are final, public, and static. No modifiers can be applied. Variables in interfaces must be initialized.

5.4 Combining Interfaces

Interfaces can incorporate one or more other interfaces, using the extends keyword as follows:

```
interface DoesItAll extends Storing, Painting {
    void doesSomethingElse();
}
```

6 *Packages*

Packages are groups of classes and interfaces. They are a tool for managing a large namespace and avoiding conflicts. Every class and interface name is contained in some package. By convention, package names consist of period-separated words, with the first name representing the organization that developed the package.

7 Expressions

6.1 Specifying a Compilation Unit's Package

The package that a compilation unit is in is specified by a package statement. When this statement is present, it must be the first non-comment, non-white space line in the compilation unit. It has the following format:

```
package packageName;
```

When a compilation unit has no package statement, the unit is placed in a default package, which has no name.

6.2 Using Classes and Interfaces from Other Packages

The language provides a mechanism for making the definitions and implementations of classes and interfaces available across packages. The import keyword is used to mark classes as being imported into the current package. A compilation unit automatically imports every class and interface in its own package.

Code in one package can specify classes or interfaces from another package in one of two ways:

- By prefacing each reference to the class or interface name with the name of its package:

```
    // prefacing with a package
    acme.project.FooBar obj = new acme.project.FooBar();
    ```

- By importing the class or interface or the package that contains it, using an import statement. Importing a class or interface makes the name of the class or interface available in the current namespace. Importing a package makes the names of all of its public classes and interfaces available. The construct:

```
    // import all classes from acme.project
    import acme.project.*;
    ``` means that every public class from acme.project is imported.

The following construct imports a single class, Employee_List, from the acme.project package:

```
    // import Employee_List from acme.project
    import acme.project.Employee_List;
    Employee_List obj = new Employee_List();
    ```

It is illegal to specify an ambiguous class name and doing so always generates a compile-time error. Class names may be disambiguated through the use of a fully qualified class name, i.e., one that includes the name of the class's package.

7 Expressions

Expressions in the language are much like expressions in C.

7 Expressions 7.1 Operators

The operators, from highest to lowest precedence, are:

```
. [] ()
++ -- ! ~ instanceof
* / %
+ -
<< >> >>>
< > <= >=
== !=
&
^
|
&&
||
?:
= op=
,
```

7.1.1 *Operators on Integers*

For operators with integer results, if any operand is long, the result type is long. Otherwise the result type is int—never byte, short, or char. Thus, if a variable i is declared a short or a byte, i+1 would be an int. When a result outside an operator's range would be produced, the result is reduced modulo the range of the result type.

The unary integer operators are:

| Operator | Operation |
|---|---|
| - | unary negation |
| ~ | bitwise complement |
| ++ | Increment |
| -- | Decrement |

The ++ operator is used to express incrementing directly. Incrementing can also be expressed indirectly using addition and assignment. ++lvalue means lvalue+=1. ++lvalue also means lvalue=lvalue+1 (as long as lvalue has no side effects). The -- operator is used to express decrementing. The ++ and -- operators can be used as both prefix and postfix operators.

7 Expressions

The binary integer operators are:

| Operator | Operation[a] |
|---|---|
| + | addition |
| - | subtraction |
| * | multiplication |
| / | division |
| % | modulus |
| & | bitwise AND |
| \| | bitwise OR |
| ^ | bitwise XOR |
| << | left shift |
| >> | sign-propagating right shift |
| >>> | zero-fill right shift | a. integer *op* integer => integer

Integer division rounds toward zero. Division and modulus obey the identity
(a/b)*b + (a%b) == a.

The only exceptions for integer arithmetic are caused by a divide or modulus by zero, which throw the ArithmeticException. An underflow generates zero. An overflow leads to wrap-around, i.e., adding 1 to the maximum integer wraps around to the minimum integer.

An *op=* assignment operator corresponds to each of the binary operators in the above table.

The integer relational operators <, >, <=, >=, ==, and != produce boolean results.

7.1.2  Operators on Boolean Values

Variables or expressions that are boolean can be combined to yield other boolean values. The unary operator ! is boolean negation. The binary operators &, |, and ^ are the logical AND, OR, and XOR operators; they force evaluation of both operands. To avoid evaluation of right-hand operands, you can use the short-cut evaluation operators && and ||. You can also use == and !=. The assignment operators also work: &=, |=, ^=. The ternary conditional operator ?: works as it does in C.

7.1.3  Operators on Floating Point Values

Floating point values can be combined using the usual operators: unary -; binary +, -, *, and /; and the assignment operators +=, -=, *=, and /=. The ++ and -- operators also work on floating point values (they add or subtract 1.0). In addition, % and %= work on floating point values, i.e., a % b 7 Expressions is the same as:

```
a - ((int)(a / b) * b)
```

This means that a%b is the floating point equivalent of the remainder after division.

Floating point expressions involving only single-precision operands are evaluated using single-precision operations and produce single-precision results. Floating point expressions that involve at least one double-precision operand are evaluated using double-precision operations and produce double-precision results.

The language has no arithmetic exceptions for floating point arithmetic. Following the IEEE 754 floating point specification, the distinguished values Inf and NaN are used instead. Overflow generates Inf. Underflow generates 0. Divide by zero generates Inf.

The usual relational operators are also available and produce boolean results: >, <, >=, <=, ==, !=. Because of the properties of NaN, floating point values are not fully ordered, so care must be taken in comparison. For instance, if a<b is not true, it does not follow that a>=b. Likewise, a!=b does not imply that a>b || a<b. In fact, there may no ordering at all.

Floating point arithmetic and data formats are defined by IEEE 754, "Standard for Floating Point Arithmetic." See "Appendix: Floating Point" on page 33 for details on the language's floating point implementation.

7.1.4  *Operators on Arrays*

The following:

```
<expression>[<expression>]
``` gets the value of an element of an array. Legal ranges for the expression are from 0 to the length of the array minus 1. The range is checked only at runtime.

7.1.5  *Operators on Strings*

Strings are implemented as String objects (see "String Literals" on page 4 for more information). The operator + concatenates Strings, automatically converting operands into Strings if necessary. If the operand is an object it can define a method call toString() that returns a String in the class of the object.

```
// Examples of the + operator used with strings
float a = 1.0;
print("The value of a is " + a + "\n");
String s = "a = " + a;
```

The += operator works on Strings. Note, that the left hand side (s1 in the following example) is evaluated only once.

```
s1 += a; //s1 = s1 + a; // a is converted to String if necessary
```

8 Statements

7.1.6 *Operators on Objects*

The binary operator instanceof tests whether the specified object is an instance of the specified class or one of its subclasses. For example:

```
if (thermostat instanceof MeasuringDevice) {
    MeasuringDevice dev = (MeasuringDevice)thermostat;
        ...
}
``` determines whether thermostat is a MeasuringDevice object (an instance of MeasuringDevice or one of its subclasses).

7.2 Casts and Conversions

The Java language and runtime system restrict casts and conversions to help prevent the possibility of corrupting the system. Integers and floating point numbers can be cast back and forth, but integers cannot be cast to arrays or objects. Objects cannot be cast to base types. An instance can be cast to a superclass with no penalty, but casting to a subclass generates a runtime check. If the object being cast to a subclass is not an instance of the subclass (or one of its subclasses), the runtime system throws a ClassCastException.

8 *Statements*

8.1 Declarations

Declarations can appear anywhere that a statement is allowed. The scope of the declaration ends at the end of the enclosing block.

In addition, declarations are allowed at the head of for statements, as shown below:

```
for (int i = 0; i < 10; i++) {
    ...
}
```

Items declared in this way are valid only within the scope of the for statement. For example, the preceding code sample is equivalent to the following:

```
{
    int i = 0;
    for (; i < 10; i++) {
    ...
    }
}
```

8.2 Expressions

Expressions are statements:

```
a = 3;
print(23);
foo.bar();
```

8 Statements

8.3 Control Flow

The following is a summary of control flow:

```
if(boolean) statement
else statement
switch(e1) {
        case e2: statements
        default: statements
}
break [label];
continue [label];
return e1;
for([e1]; [e2]; [e3]) statement
while(boolean) statement
do statement while(boolean);
label:statement
```

The language supports labeled loops and labeled breaks, for example:

```
outer:   // the label
    for (int i = 0; i < 10; i++) {
        for (int j= 0; j< 10; j++) {
            if (...) {
                break outer;
            }
            if (...) {
            }
        }
    }
```

The use of labels in loops and breaks has the following rules:

- Any statement can have a label.
- If a break statement has a label it must be the label of an enclosing statement.
- If a continue statement has a label it must be the label of an enclosing loop.

8.4 Exceptions

When an error occurs in an Java program—for example, when an argument has an invalid value—the code that detects the error can *throw* an exception[1]. By default, exceptions result in the thread terminating after printing an error message. However, programs can have *exception handlers* that *catch* the exception and recover from the error.

Some exceptions are thrown by the Java runtime system. However, any class can define its own exceptions and cause them to occur using throw statements. A throw statement consists of the throw keyword followed by an object. By convention, the object should be an instance of Exception or one of its subclasses. The throw statement causes execution to switch to the appropriate exception handler. When a throw statement is executed, any code following it is not executed, and no value is returned by its enclosing method. The following example shows how to create a subclass of Exception and throw an exception.

```
class MyException extends Exception {
}
```

---

[1]. Java exception handling closely follows the proposal in the second edition of *The C++ Programming Language*, by Bjarne Stroustrup.

8 Statements

```
class MyClass {
    void oops() {
        if (/* no error occurred */) {
            ...
        } else { /* error occurred */
        throw new MyException();
        }
    }
}
```

To define an exception handler, the program must first surround the code that can cause the exception with a try statement. After the try statement come one or more catch statements—one per exception class that the program can handle at that point. In each catch statement is exception handling code. For example:

```
try {
    p.a = 10;
} catch (NullPointerException e) {
    println("p was null");
} catch (Exception e) {
    println("other error occurred");
} catch (Object obj) {
    println("Who threw that object?");
}
```

A catch statement is like a method definition with exactly one parameter and no return type. The parameter can be either a class or an interface. When an exception occurs, the nested try/catch statements are searched for a parameter that matches the exception class. The parameter is said to match the exception if it:

- is the same class as the exception; or
- is a superclass of the exception; or
- if the parameter is an interface, the exception class implements the interface.

The first try/catch statement that has a parameter that matches the exception has its catch statement executed. After the catch statement executes, execution resumes after the try/catch statement. It is not possible for an exception handler to resume execution at the point that the exception occurred. For example, this code fragment:

```
print("now ");
try {
    print("is ");
    throw new MyException();
    print("a ");
} catch(MyException e) {
    print("the ");
}
print("time\n");
``` prints "now is the time". As this example shows, exceptions don't have to be used only for error handling, but any other use is likely to result in code that's hard to understand.

Exception handlers can be nested, allowing exception handling to happen in more than one place. Nested exception handling is often used when the first handler can't recover completely from the error, yet needs to execute some cleanup code (as shown in the following code example). To pass exception handling up to the next higher handler, use the throw keyword using the same object that was

8 Statements caught. Note that the method that rethrows the exception stops executing after the throw statement; it never returns.

```
try {
    f.open();
} catch(Exception e) {
    f.close();
    throw e;
}
```

8.4.1 The finally *Statement*

The following example shows the use of a finally statement that is useful for guaranteeing that some code gets executed whether or not an exception occurs. For example, the following code example:

```
try {
    // do something
} finally {
    // clean up after it
}
``` is similar to:

```
try {
    // do something
} catch(Object e){
    // clean up after it
    throw e;
}
// clean up after it
```

The finally statement is executed even if the try block contains a return, break, continue, or throw statement. For example, the following code example always results in "finally" being printed, but "after try" is printed only if a != 10.

```
try {
    if (a == 10) {
        return;
    }
} finally {
    print("finally\n");
}
print("after try\n");
```

8.4.2 *Runtime Exceptions*

This section contains a list of the exceptions that the Java runtime throws when it encounters various errors.

ArithmeticException

Attempting to divide an integer by zero or take a modulus by zero throw the ArithmeticException—no other arithmetic operation in Java throws an exception. For information on how Java handles other arithmetic errors see "Operators on Integers" on page 23 and "Operators on Floating Point Values" on page 24.

For example, the following code causes an ArithmeticException to be thrown:

```
class Arith {
    public static void main(String args[]) {
        int j = 0;
        j = j / j;
```

8 Statements

```
        }
    }
```

NullPointerException

An attempt to access a variable or method in a null object or a element in a null array throws a NullPointerException. For example, the accesses o.length and a[0] in the following class declaration throws a NullPointerException at runtime.

```
class Null {
    public static void main(String args[]) {
        String o = null;
        int a[] = null;
        o.length();
        a[0] = 0;
    }
}
```

It is interesting to note that if you throw a null object you actually throw a NullPointerException.

IncompatibleClassChangeException

In general the IncompatibleClassChangeException is thrown whenever one class's definition changes but other classes that reference the first class aren't recompiled. Four specific changes that throw a IncompatibleClassChangeException at rutime are:

- A variable's declaration is changed from static to non-static in one class but other classes that access the changed variable aren't recompiled.
- A variable's declaration is changed from non-static to static in one class but other classes that access the changed variable aren't recompiled.
- A field that is declared in one class is deleted but other classes that access the field aren't recompiled.
- A method that is declared in one class is deleted but other classes that access the method aren't recompiled.

ClassCastException

A ClassCastException is thrown if an attempt is made to cast an object O into a class C and O is neither C nor a subclass of C. For more information on casting see "Casting Between Class Types" on page 8.

The following class declaration results in a ClassCastException at runtime:

```
class ClassCast {
    public static void main(String args[]) {
        Object o = new Object();
        String s = (String)o;         // the cast attempt
        s.length();
    }
}
```

NegativeArraySizeException

A NegativeArraySizeException is thrown if an array is created with a negative size. For example, the following class definition throws a NegativeArraySizeException at runtime:

8 Statements

```
class NegArray {
    public static void main(String args[]) {
        int a[] = new int[-1];
        a[0] = 0;
    }
}
```

OutOfMemoryException

An OutOfMemoryException is thrown when the system can no longer suppy the application with memory. The OutOfMemoryException can only occur during the creation of an object, i.e., when new is called. For example, the following code results in an OutOfMemoryException at runtime:

```
class Link {
    int a[] = new int[1000000];
    Link l;
}
class OutOfMem {
    public static void main(String args[]) {
        Link root = new Link();
        Link cur = root;
        while(true) {
            cur.l = new Link();
            cur = cur.l;
        }
    }
}
```

NoClassDefFoundException

A NoClassDefFoundException is thrown if a class is referenced but the runtime system cannot find the referenced class.

For example, class NoClass is declared:

```
class NoClass {
    public static void main(String args[]) {
        C c = new C();
    }
}
```

When NoClass is run, if the runtime system can't find C.class it throws the NoClassDefFoundException.

Note: C.class must have existed at the time NoClass is compiled.

IncompatibleTypeException

An IncompatibleTypeException is thrown if an attempt is made to instantiate an interface. For example, the following code causes an IncompatibleTypeException to be thrown.

```
interface I {
}
class IncompType {
    public static void main(String args[]) {
        I r = (I)new("I");
    }
}
```

8 Statements

ArrayIndexOutOfBoundsException

An attempt to access an invalid element in an array throws an ArrayIndexOutOfBoundsException. For example:

```
class ArrayOut {
    public static void main(String args[]) {
        int a[] = new int[0];
        a[0] = 0;
    }
}
```

UnsatisfiedLinkException

An UnsatisfiedLinkException is thrown if a method is declared native and the method cannot be linked to a routine in the runtime.

```
class NoLink {
    static native void foo();

public static void main(String args[]) {
        foo();
    }
}
```

InternalException

An InternalException should never be thrown. It's only thrown if some consistency check in the runtime fails. Please send mail to java@java.Sun.COM if you have a reproducible case that throws this exception.

A Appendix: Floating Point

A  Appendix: Floating Point

This appendix discusses properties of Java floating point arithmetic: general precision notes and special values, binary format conversion, ordering. At the end is a section summarizing the differences between Java arithmetic and the IEEE 754 standard. For more information on the IEEE 754 standard, see "IEEE Standard for Binary Floating-Point Arithmetic, ANSI/IEEE Std. 754-1985."

Operations involving only single-precision float and integer values are performed using at least single-precision arithmetic and produce a single-precision result. Other operations are performed in double precision and produce a double precision result. Java floating-point arithmetic produces no exceptions.

Underflow is gradual.

A.1  Special Values

There is both a positive zero and a negative zero. The latter can be produced in a number of special circumstances: the total underflow of a * or / of terms of different sign; the addition of -0 to itself or subtraction of positive zero from it; the square root of -0. Converting -0 to a string results in a leading '-'. Apart from this, the two zeros are indistinguishable.

Calculations which would produce a value beyond the range of the arithmetic being used deliver a signed infinite result. An infinity (Inf) has a larger magnitude than any value with the same sign. Infinities of the same sign cannot be distinguished. Thus, for instance (1./0.) + (1./0.) == (1./0.). Division of a finite value by infinity yields a 0 result.

Calculations which cannot produce any meaningful numeric result deliver a distinguished result called Not A Number (NaN). Any operation having a NaN as an operand produces a NaN as the result. NaN is not signed and not ordered (see "Ordering"). Division of infinity by infinity yields NaN, as does subtraction of one infinity from another of the same sign.

A.2  Binary Format Conversion

Converting a floating-point value to an integer format results in a value with the same sign as the argument value and having the largest magnitude less than or equal to that of the argument. In other words, conversion rounds towards zero. Converting infinity or any value beyond the range of the target integer type gives a result having the same sign as the argument and the maximum magnitude of that sign. Converting NaN results in 0.

Converting an integer to a floating format results in the closest possible value in the target format. Ties are broken in favor of the most even value (having 0 as the least-significant bit).

A Appendix: Floating Point

A.3 Ordering

The usual relational operators can be applied to floating-point values. With the exception of NaN, all floating values are ordered, with -Inf < all finite values < Inf.

-Inf == -Inf, +Inf == +Inf, -0. == 0. The ordering relations are transitive. Equality and inequality are reflexive.

NaN is unordered. Thus the result of any order relation between NaN and any other value is false and produces 0. The one exception is that "NaN != anything" is true.

Note that, because NaN is unordered, Java's logical inversion operator, !, does not distribute over floating point relationals as it can over integers.

A.4 Summary of IEEE-754 Differences

Java arithmetic is a subset of the IEEE-754 standard. Here is a summary of the key differences.

- Nonstop Arithmetic—The Java system will not throw exceptions, traps, or otherwise signal the IEEE exceptional conditions: invalid operation, division by zero, overflow, underflow, or inexact. Java has no signaling NaN.
- Rounding—Java rounds inexact results to the nearest representable value, with ties going to the value with a 0 least-significant bit. This is the IEEE default mode. But, Java rounds towards zero when converting a floating value to an integer. Java does not provide the user-selectable rounding modes for floating-point computations: up, down, or towards zero.
- Relational set—Java has no relational predicates which include the unordered condition, except for !=. However, all cases but one can be constructed by the programmer, using the existing relations and logical inversion. The exception case is ordered but unequal. There is no specific IEEE requirement here.
- Extended formats—Java does not support any extended formats, except that double will serve as single-extended. Other extended formats are not a requirement of the standard.

B Appendix: Java Language Grammar

B  Appendix: Java Language Grammar

This is a short grammar for a Java compilation unit. A Java program consists of one or more compilation units.

The grammar has undefined terminal symbols DocComment, Identifier, Number, String, and Character. Quoted text signifies literal terminals.

Each rule is of the form nonterminal = meta-expression ; Other meta-notation is: | for alternation, ( ... ) for grouping, postfix ? for 0 or 1 occurrences, postfix + for 1 or more occurrence, and postfix * for 0 or more occurrences.

```
CompilationUnit =
    PackageStatement? ImportStatement* TypeDeclaration*
;

PackageStatement =
    'package' PackageName ';'
;

ImportStatement =
    'import' PackageName '.' '*' ';'
|   'import' ( ClassName | InterfaceName ) ';'
;

TypeDeclaration =
    ClassDeclaration
|   InterfaceDeclaration
|   ';'
;

ClassDeclaration =
    Modifier* 'class' Identifier
    ('extends' ClassName)?
    ('implements' InterfaceName (',' InterfaceName)*)?
    '{' FieldDeclaration* '}'
;

InterfaceDeclaration =
    Modifier* 'interface' Identifier
    ('extends' InterfaceName (',' InterfaceName)*)?
    '{' FieldDeclaration* '}'
;

FieldDeclaration =
    DocComment? MethodDeclaration
|   DocComment? ConstructorDeclaration
|   DocComment? VariableDeclaration
|   StaticInitializer
|   ';'
;

MethodDeclaration =
    Modifier* Type Identifier '(' ParameterList? ')' ( '[' ']' )*
    ( '{' Statement* '}' | ';' )
;

ConstructorDeclaration =
    Modifier* Identifier '(' ParameterList? ')'
    '{' Statement* '}'
;

VariableDeclaration =
    Modifier* Type VariableDeclarator (',' VariableDeclarator)* ';'
;
```

B Appendix: Java Language Grammar

*VariableDeclarator* =
    Identifier (`[` `]`)* (`=` *VariableInitializer*)?
;

*VariableInitializer* =
    *Expression*
|   `{` ( *VariableInitializer* ( `,` *VariableInitializer* )* `,`? )? `}`
;

*StaticInitializer* =
    `static` `{` *Statement*\* `}`
;

*ParameterList* =
    *Parameter* (`,` *Parameter*)*
;

*Parameter* =
    *TypeSpecifier* Identifier (`[` `]`)*
;

*Statement* =
    *VariableDeclaration*
|   *Expression* `;`
|   `{` *Statement*\* `}`
|   `if` `(` *Expression* `)` *Statement* (`else` *Statement*)?
|   `while` `(` *Expression* `)` *Statement*
|   `do` *Statement* `while` `(` *Expression* `)` `;`
|   `try` *Statement* (`catch` `(` *Parameter* `)` *Statement*)*
    (`finally` *Statement*)?
|   `switch` `(` *Expression* `)` `{` *Statement*\* `}`
|   `synchronized` `(` *Expression* `)` *Statement*
|   `return` *Expression*? `;`
|   `throw` *Expression* `;`
|   `case` *Expression* `:`
|   `default` `:`
|   Identifier `:` *Statement*
|   `break` Identifier? `;`
|   `continue` Identifier? `;`
|   `;`
;

*Expression* =
    *Expression* `+` *Expression*
|   *Expression* `-` *Expression*
|   *Expression* `*` *Expression*
|   *Expression* `/` *Expression*
|   *Expression* `%` *Expression*
|   *Expression* `^` *Expression*
|   *Expression* `&` *Expression*
|   *Expression* `|` *Expression*
|   *Expression* `&&` *Expression*
|   *Expression* `||` *Expression*
|   *Expression* `<<` *Expression*
|   *Expression* `>>` *Expression*
|   *Expression* `>>>` *Expression*
|   *Expression* `=` *Expression*
|   *Expression* `+=` *Expression*
|   *Expression* `-=` *Expression*
|   *Expression* `*=` *Expression*
|   *Expression* `/=` *Expression*
|   *Expression* `%=` *Expression*
|   *Expression* `^=` *Expression*
|   *Expression* `&=` *Expression*
|   *Expression* `|=` *Expression*
|   *Expression* `<<=` *Expression*
|   *Expression* `>>=` *Expression*
|   *Expression* `>>>=` *Expression*

B Appendix: Java Language Grammar

```
    |   Expression  '<'  Expression
    |   Expression  '>'  Expression
    |   Expression  '<='  Expression
    |   Expression  '>='  Expression
    |   Expression  '=='  Expression
    |   Expression  '!='  Expression
    |   Expression  '.'  Expression
    |   Expression  ','  Expression
    |   Expression  'instanceof'  ( ClassName | InterfaceName )
    |   Expression  '?'  Expression  ':'  Expression
    |   Expression  '['  Expression  ']'
    |   '++'  Expression
    |   '--'  Expression
    |   Expression  '++'
    |   Expression  '--'
    |   '-'  Expression
    |   '!'  Expression
    |   '~'  Expression
    |   '('  Expression  ')'
    |   '('  Type  ')'  Expression
    |   Expression  '('  ArgList?  ')'
    |   'new'  ClassName  '('  ArgList? ')'
    |   'new'  TypeSpecifier ( '['  Expression ']' )+ ( '['  ']' )*
    |   'new'  '('  Expression  ')'
    |   'true'
    |   'false'
    |   'null'
    |   'super'
    |   'this'
    |   Identifier
    |   Number
    |   String
    |   Character
    ;

ArgList =
    Expression ( ','  Expression ) *
;

Type =
    TypeSpecifier ( '['  ']' ) *
;

TypeSpecifier =
        'boolean'
    |   'byte'
    |   'char'
    |   'short'
    |   'int'
    |   'float'
    |   'long'
    |   'double'
    |   ClassName
    |   InterfaceName
;

Modifier =
        'public'
    |   'private'
    |   'protected'
    |   'static'
    |   'final'
    |   'native'
    |   'synchronized'
    |   'abstract'
    |   'threadsafe'
```

B Appendix: Java Language Grammar

```
|    'transient'
;

PackageName =
    Identifier
|   PackageName '.' Identifier
;

ClassName =
    Identifier
|   PackageName '.' Identifier
;

InterfaceName =
    Identifier
|   PackageName '.' Identifier
;
```

Index

Symbols
!, 24
-, 24
!=, 24, 25
%, 24
&, 24
&&, 24
&=, 24
*, 24
*=, 24
+, 24, 25
+=, 24
-, unary, 23
-, unary, 24
/, 24
/=, 24
<, 24, 25
<<, 24
<=, 24, 25
-=, 24
==, 24, 25
>, 24, 25
>=, 24, 25
>>, 24
>>>, 24
^, 24
^=, 24
|, 24
|=, 24
||, 24
~, 23

B
boolean, 3
boolean expressions, 27
break, 27
byte, 5

C
case, 27
casting, 8, 26
catch, 28
char, 5
classes, 5, 7, 21, 26
comments, 2
constructors, 12
continue, 27

D
declaration order, 16
default, 27
do, 27
double, 5
double precision, 3, 5, 24

E
else, 27
exceptions, 27
extends, 8

F
final, 18
finally, 29
float, 5
floating point, 3, 5, 24
floating point, ordering of values, 25
for, 26, 27

I
if, 27
implements, 8
import, 22
instanceof, 26
int, 5
integers, 5, 23
interface, 20 interfaces, 8, 20

L length
    length of an array, 7
literals, 3
long, 5

M methods, 9

O object storage, 14
    (See also memory management)
objects, 14
OR, logical, 24

P package, 22
packages, 21

R return, 27

S short, 5
static, 15
static initializer, 15
String, 4, 25
strings, 4, 6, 25
super, 13
switch, 27
synchronize, 19
synchronized, 19

T this, 10
throw, 27
transient, 18
try, 28

U

Unicode, 1
    characters, 5

V void, 9

W while, 27

X

XOR, logical, 24

What is claimed:

1. A method for enabling an application program to communicate with a network server, the method comprising:
   downloading a document from a document server to the application program;
   downloading code from a code server associated with the document server to the application program, the code including platform independent code implementing a network protocol for the network server; and
   using the network protocol to communicate with the network server.

2. The method of claim 1, further comprising: invoking an object in the network server using the code.

3. The method of claim 1, further comprising:
   using a network name server to locate the network server.

4. The method of claim 1, further comprising: using an object name server in the network server to locate an object.

5. The method of claim 1, wherein the document server and the code server are in the same address space.

6. The method of claim 1, wherein the network server, the document server and the code server are in the same address space.

7. The method of claim 1, wherein the code also includes a stub for an object within the network server.

8. The method of claim 1, wherein the code is machine independent.

9. The method of claim 8, wherein the platform independent code comprises bytecodes.

10. The method of claim 1, wherein the network protocol is different from a default network protocol used by the application program.

11. The method of claim 1, wherein the step of downloading code is performed if it is determined that the application program needs to communicate with the network server.

12. The method of claim 1, wherein the platform independent code implementing the network protocol and the application program are in the same address space.

13. A distributed computing system, including a network server, comprising:
   a document server for storing a plurality of documents;
   a code server for storing a plurality of code associated with the plurality of documents, the plurality of code including platform independent code implementing a network protocol; and
   an application program for loading a document from the plurality of documents, for loading code from the plurality of code associated with the document, and for using the network protocol implemented by the platform independent code to communicate with the network server.

14. The distributed computing system of claim 13, wherein the code invokes an object within the network server.

15. The distributed computing system of claim 13, wherein the document server and the code server are in the same address space.

16. The distributed computing system of claim 13,
   wherein the network server is object-oriented and includes an object; and
   wherein the code includes a stub for an object within the network server.

17. The distributed computing system of claim 13, wherein the application program loads the code if it is determined that the application program needs to communicate with the network server.

18. The distributed computing system of claim 13, wherein the platform independent code implementing the network protocol and the application program are in the same address space.

19. A computer program that enables an application program to communicate with a network server, comprising:
   code that downloads a document from a document server;
   code that downloads downloadable code from a code server associated with the document server, the downloadable code including platform independent code implementing a network protocol for the network server; and
   code that uses the network protocol to communicate with the network server;
   wherein the codes are stored on a tangible medium.

20. The computer program of claim 19, further comprising code that invokes an object in the network server using the downloadable code.

21. The computer program of claim 19, wherein the downloadable code also includes a stub for an object within the network server.

22. The computer program of claim 19, wherein the downloadable code is machine independent.

23. The computer program of claim 19, wherein the network protocol is different from a default network protocol used by the application program.

24. The computer program of claim 19, further comprising code that determines whether the application program needs to communicate with the network server.

25. An apparatus for enabling an application program to communicate with a network server, the apparatus comprising:
   a machine configured to download a document from a document server to the application program;
   a machine configured to download code from a code server associated with the document server to the application program, the code including platform independent code implementing a network protocol for the network server; and
   a machine configured to use the network protocol to communicate with the network server.

26. The apparatus of claim 25, further comprising:
   a machine configured to use a network name server to locate the network server using the code.

27. The apparatus of claim 25, further comprising:
   a machine configured to use an object name server in the network server to locate an object using the code.

28. The apparatus of claim 25, wherein the code also includes a stub for an object within the network server.

29. The apparatus of claim 25, wherein the platform independent code comprises bytecodes.

30. A method for enabling an application program to receive communications from a network client, the method comprising: downloading a document from a document server to the application program;
   downloading code from a code server associated with the document server to the application program, the code including platform independent code implementing a network protocol for the network client, and using the network protocol to receive communications from the network client.

31. The method of claim 30, further comprising:

calling an object in the application program.

32. The method of claim 20, further comprising:

publishing a network server name for the application program in a network name server.

33. The method of claim 30, wherein the application program includes an object; the method further comprising:

publishing the object name in an object name server.

34. The method of claim 30, wherein the document server and the code server are in the same address space.

35. The method of claim 30, wherein the network client, the document server and the code server are in the same address space.

36. The method of claim 30, wherein the code also includes a skeleton for an object to be implemented by the application program.

37. The method of claim 30, wherein the code is machine independent.

38. The method of claim 37, wherein the platform independent code comprises bytecodes.

39. The method of claim 30, wherein network protocol is different from a default network protocol used by the application program.

40. The method of claim 30, wherein the step of downloading code is performed if it is determined that the application program needs to receive communications from the network client.

41. The method of claim 30, wherein the platform independent code implementing the network protocol and the application program are in the same address space.

42. A distributed computing system, including a network client, comprising:

a document server for storing a plurality of documents;

a code server for storing a plurality of code associated with the plurality of documents, the plurality of code including platform independent code implementing a network protocol; and an application program for loading a document from the plurality of documents, for loading code from the plurality of code associated with the document, and for using the network protocol implemented by the platform independent code to receive communications from the network client.

43. The distributed computing system of claim 42, wherein the network client calls an object within the application program.

44. The distributed computing system of claim 42, wherein the document server and the code server are in the same address space.

45. The distributed computing system of claim 42, wherein the code includes a skeleton for an object within the application program.

46. The distributed computing system of claim 42, wherein the application program loads the code if it is determined that the application program needs to receive communications from the network client.

47. The distributed computing system of claim 42, wherein the platform independent code implementing the network protocol and the application program are in the same address space.

48. A computer program that enables an application program to receive communications from a network client, comprising:

code that downloads a document from a document server;

code that downloads code from a code server associated with the document server, the code including platform independent code implementing a network protocol for the network client; and code that uses the network protocol to receive communications from the network client;

wherein the codes are stored on a tangible medium.

49. The computer program of claim 48, further comprising code that invokes an object in the application program in response to the communications from the network client.

50. The computer program of claim 48, wherein the code from the code server also includes a skeleton for an object to be implemented by the application program.

51. The computer program of claim 48, wherein the code from the code server is machine independent.

52. The computer program of claim 48, wherein the network protocol is different from a default network protocol used by the application program.

53. The computer program of claim 48, further comprising code that determines whether the application program needs to receive communications from the network client.

54. An apparatus for enabling an application program to receive communications from a network client, the apparatus comprising:

a machine configured to download a document from a document server to the application program;

a machine configured to download code from a code server associated with the document server to the application program, the code including platform independent code implementing a network protocol for the network client; and a machine configured to use the network protocol to receive communications from the network client.

55. The apparatus of claim 54, further comprising:

a machine configured to publish a network server name for the application program in a network name server.

56. The apparatus of claim 54, wherein the application program includes an object; the apparatus further comprising:

a machine configured to publish the object name in an object name server.

57. The apparatus of claim 54, wherein the code also includes a skeleton for an object to be implemented by the application program.

58. The apparatus of claim 54, wherein the platform independent code comprises bytecodes.

59. A computer system for enabling an application program to receive communications from a network client, the computer system including:

a processor; and a computer readable memory comprising:

code that directs the computer system to receive data from a document server;

code that directs the computer system to receive platform independent code implementing a network protocol for the network client; and code that directs the computer system to use the network protocol handler to receive communications from the network client.

60. A computer system of claim 59, wherein the computer readable memory further comprises code that invokes an object in the application program in response to the communications from the network client.

61. A computer system of claim 59, wherein the computer readable memory further comprises code that publishes a name of an object in an object name server.

62. A computer system of claim 59, wherein the code also includes a skeleton for an object to be implemented by the application program.

63. A computer system of claim 59, wherein the platform independent code comprises bytecodes.

64. A computer system of claim 59, wherein the computer readable memory further comprises code for determining whether the application program needs to receive communications from the network client.

65. A computer system for enabling an application program to communicate with a network server, the computer system including:

a processor; and a computer readable memory comprising:

code that directs the processor to receive data from a document server;

code that directs the processor to receive platform independent code implementing a network protocol for the network server; and code that directs the processor to use the network protocol to communicate with the network server.

66. A computer system of claim 65, wherein the computer readable memory further comprises code that invokes an object in the network server using the code.

67. A computer system of claim 65, wherein the computer readable memory further comprises code that uses a network name server to locate the network server.

68. A computer system of claim 65, wherein the code also includes a stub for an object within the network server.

69. A computer system of claim 65, wherein the platform independent code comprises bytecodes.

70. A computer system of claim 65, wherein the computer readable memory further comprises code for determining whether the application program needs to communicate with the network server.

* * * * *